(12) United States Patent
Barten

(10) Patent No.: US 9,305,201 B2
(45) Date of Patent: Apr. 5, 2016

(54) SYMBOL READING SYSTEM WITH INTEGRATED SCALE BASE

(71) Applicant: METROLOGIC INSTRUMENTS, INC., Blackwood, NJ (US)

(72) Inventor: Henri Jozef Maria Barten, Lommel (BE)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 14/333,588

(22) Filed: Jul. 17, 2014

(65) Prior Publication Data

US 2014/0326787 A1 Nov. 6, 2014

Related U.S. Application Data

(63) Continuation of application No. 13/019,439, filed on Feb. 2, 2011, now Pat. No. 8,789,757.

(51) Int. Cl.
| | |
|---|---|
| *G02B 26/10* | (2006.01) |
| *G06K 7/10* | (2006.01) |
| *A47F 9/04* | (2006.01) |
| *G01G 19/414* | (2006.01) |
| *G01G 21/22* | (2006.01) |
| *G06K 7/00* | (2006.01) |

(Continued)

(52) U.S. Cl.
CPC ............... *G06K 7/1096* (2013.01); *A47F 9/046* (2013.01); *G01G 19/4144* (2013.01); *G01G 21/22* (2013.01); *G01G 21/30* (2013.01); *G06K 7/0004* (2013.01); *G06K 7/10544* (2013.01); *G06Q 20/208* (2013.01)

(58) Field of Classification Search
USPC ............... 235/375, 379, 380, 462.11, 462.25, 235/462.41
See application file for complete search history.

(56) References Cited

U.S. PATENT DOCUMENTS 1,379,215 A 5/1921 Riedel
4,229,588 A 10/1980 Louthan
(Continued)

FOREIGN PATENT DOCUMENTS

CN 202916925 U 5/2013
EP 2485176 A2 8/2012

OTHER PUBLICATIONS

European Search Report issued in European Application EP 12 15 3491 (Published as EP2485176 on Aug. 8, 2012), dated Sep. 24, 2012, 3 pages.
(Continued)

*Primary Examiner* — Michael G Lee
*Assistant Examiner* — Tabitha Chedekel
(74) *Attorney, Agent, or Firm* — Additon, Higgins & Pendleton, P.A.

(57) ABSTRACT

A symbol-reading system includes a system housing having a horizontal housing portion and a vertical housing portion, the vertical housing portion being configured substantially orthogonal to the horizontal housing portion. The symbol-reading system also includes a symbol reading subsystem, disposed in the system housing, for reading symbols on objects and producing data representative of the read symbols. Additionally, the symbol-reading system includes a weigh scale subsystem including at least one load cell that supports the entirety of the system housing, the weigh scale subsystem being configured for measuring the weight of objects on the system housing and producing data representative of measured weights.

21 Claims, 29 Drawing Sheets

(51) Int. Cl.
    *G06Q 20/20*     (2012.01)
    *G01G 21/30*     (2006.01)

(56) References Cited

U.S. PATENT DOCUMENTS

| | | | |
|---|---|---|---|
| 4,652,732 | A | 3/1987 | Nickl |
| 4,656,344 | A | 4/1987 | Mergenthaler et al. |
| 4,660,663 | A * | 4/1987 | Amacher ............ G01G 23/3707 177/165 |
| 4,960,985 | A | 10/1990 | Knowles |
| 5,747,744 | A | 5/1998 | Kraft et al. |
| 5,832,417 | A | 11/1998 | Petrucelli et al. |
| 5,834,708 | A | 11/1998 | Svetal et al. |
| 5,987,428 | A | 11/1999 | Walter |
| 5,999,663 | A | 12/1999 | Edwards et al. |
| 6,080,938 | A | 6/2000 | Lutz |
| 6,145,629 | A | 11/2000 | Addy |
| 6,155,486 | A | 12/2000 | Lutz |
| 6,155,489 | A | 12/2000 | Collins, Jr. et al. |
| 6,189,790 | B1 * | 2/2001 | Walter ................ G07G 1/0036 186/61 |
| 6,215,078 | B1 | 4/2001 | Torres et al. |
| 6,296,184 | B1 | 10/2001 | Dejaeger |
| 6,332,575 | B1 | 12/2001 | Schuessler et al. |
| 6,363,366 | B1 | 3/2002 | Henty |
| 6,547,040 | B2 | 4/2003 | Goodwin, III |
| 6,779,722 | B1 | 8/2004 | Mason |
| 6,794,586 | B1 | 9/2004 | Mason |
| 6,814,292 | B2 | 11/2004 | Good |
| 6,854,647 | B2 | 2/2005 | Collins, Jr. et al. |
| 6,898,184 | B1 | 5/2005 | Anderson et al. |
| 7,028,899 | B2 | 4/2006 | Tsikos et al. |
| 7,044,370 | B2 | 5/2006 | Bellis, Jr. et al. |
| 7,066,389 | B2 | 6/2006 | Dickover et al. |
| 7,070,097 | B2 | 7/2006 | Blanford et al. |
| 7,247,802 | B1 | 7/2007 | Minter |
| 7,370,730 | B2 | 5/2008 | Johnson et al. |
| 7,422,156 | B2 | 9/2008 | Good |
| 7,454,365 | B1 | 11/2008 | Brosnan et al. |
| 7,464,877 | B2 | 12/2008 | Kotlarsky et al. |
| 7,490,774 | B2 | 2/2009 | Zhu et al. |
| 7,533,799 | B2 | 5/2009 | Edwards |
| 7,540,424 | B2 | 6/2009 | Knowles et al. |
| 7,575,162 | B1 | 8/2009 | Malchak et al. |
| 7,587,335 | B2 | 9/2009 | Schuller et al. |
| 7,607,581 | B2 | 10/2009 | Kotlarsky et al. |
| RE41,093 | E | 2/2010 | Lutz et al. |
| 7,661,597 | B2 | 2/2010 | Knowles et al. |
| 7,708,205 | B2 | 5/2010 | Kotlarsky et al. |
| 7,753,269 | B2 | 7/2010 | Russell et al. |
| 7,780,081 | B1 | 8/2010 | Liang |
| 7,819,326 | B2 | 10/2010 | Knowles et al. |
| 7,841,524 | B2 | 11/2010 | Schmidt et al. |
| 8,033,461 | B2 | 10/2011 | Barron et al. |
| 8,136,727 | B2 | 3/2012 | Rollyson et al. |
| 8,196,822 | B2 | 6/2012 | Goncalves |
| 2006/0131416 | A1 | 6/2006 | Jwo |
| 2007/0210165 | A1 * | 9/2007 | Knowles ............ G06K 7/10693 235/462.11 |
| 2007/0290043 | A1 | 12/2007 | Russell et al. |
| 2008/0283611 | A1 | 11/2008 | Knowles et al. |
| 2012/0193407 | A1 | 8/2012 | Barten |

OTHER PUBLICATIONS

European Office Action issued in European Application EP 12 15 3491 (Published as EP2485176 on Aug. 8, 2012), Dated Nov. 2, 2012, 5 pages.

* cited by examiner

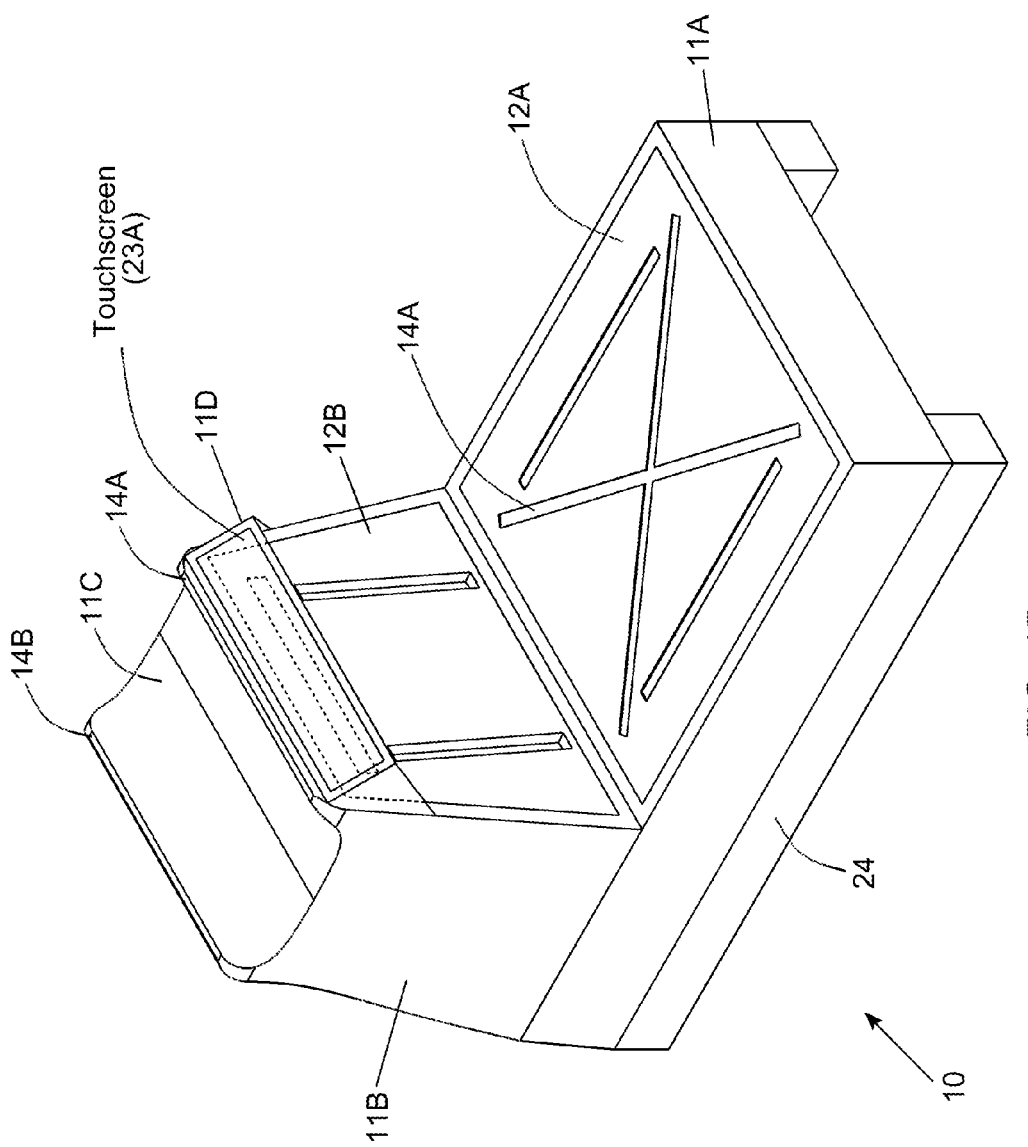

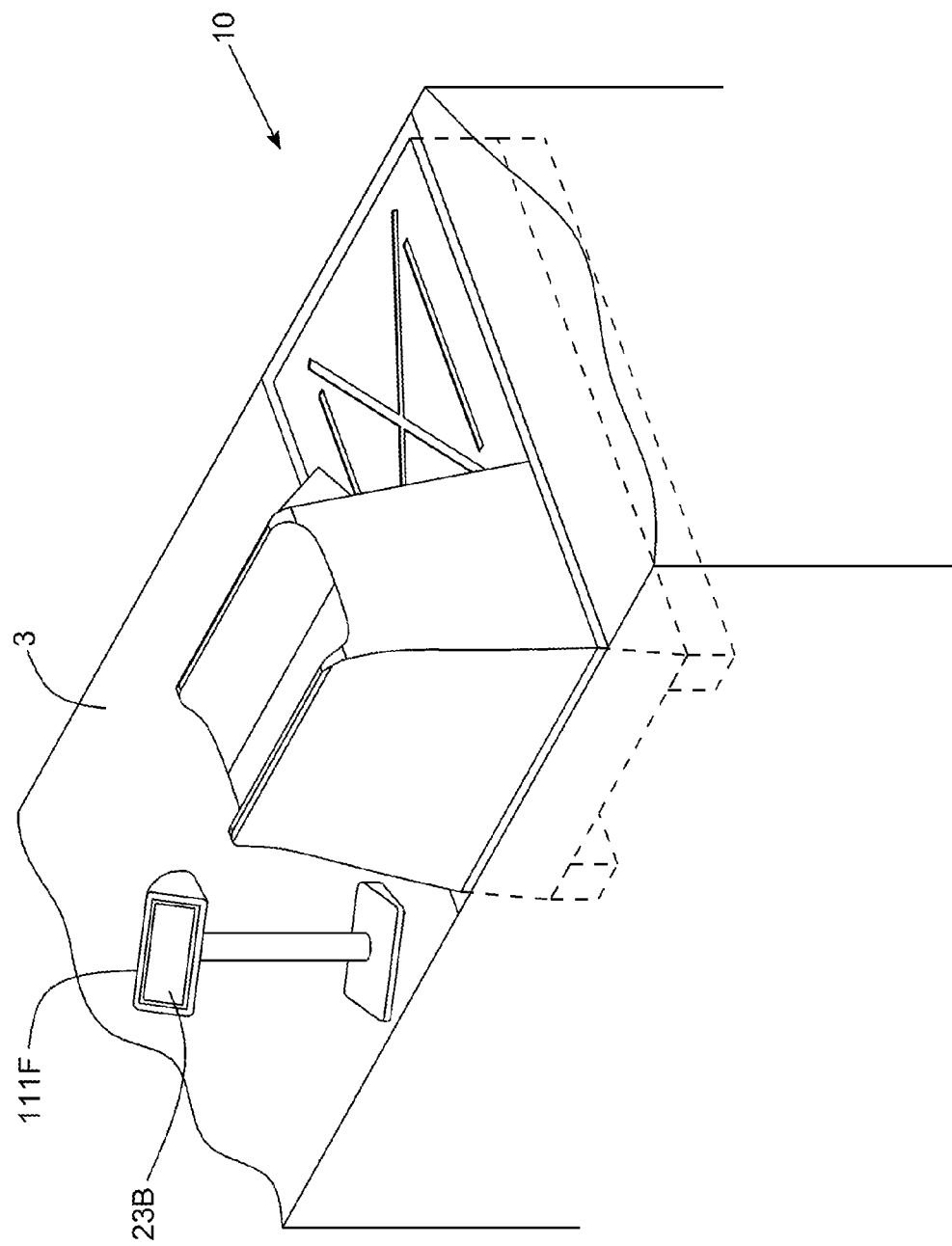

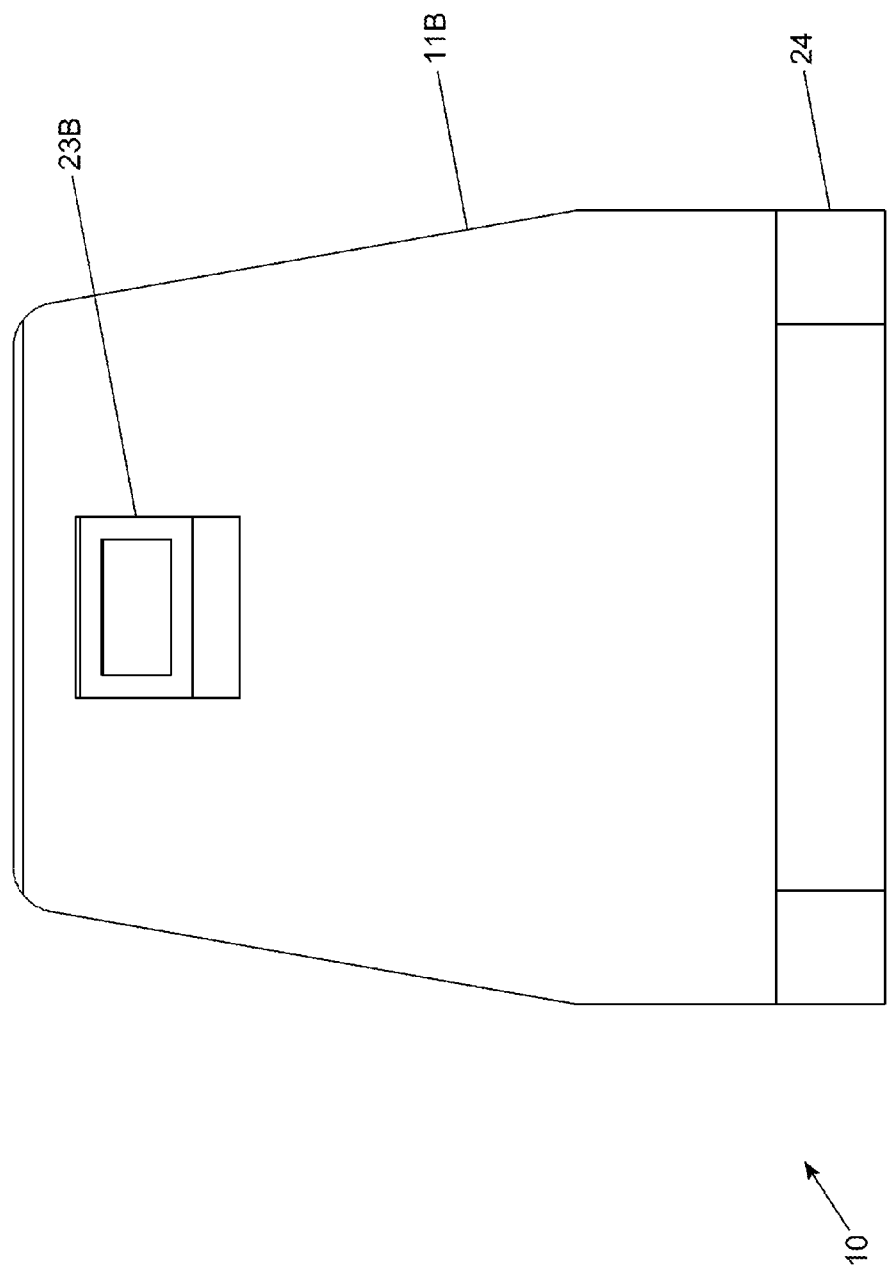
FIG. 1C2

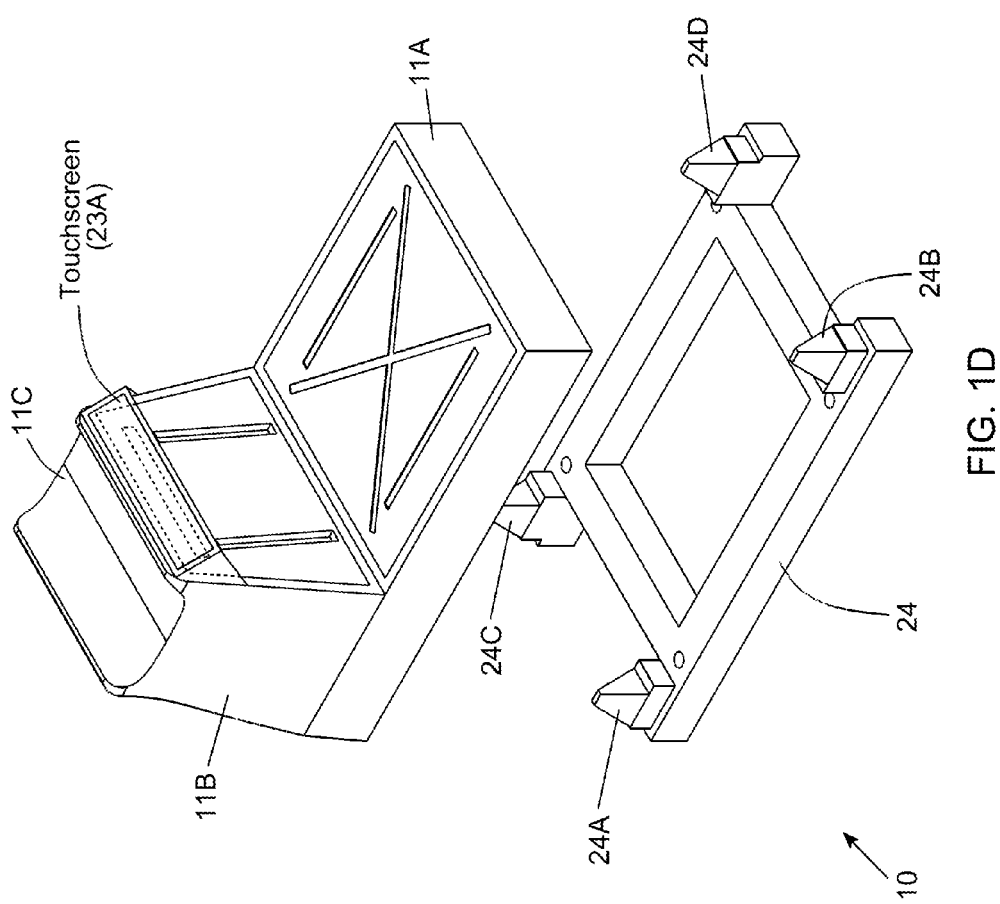

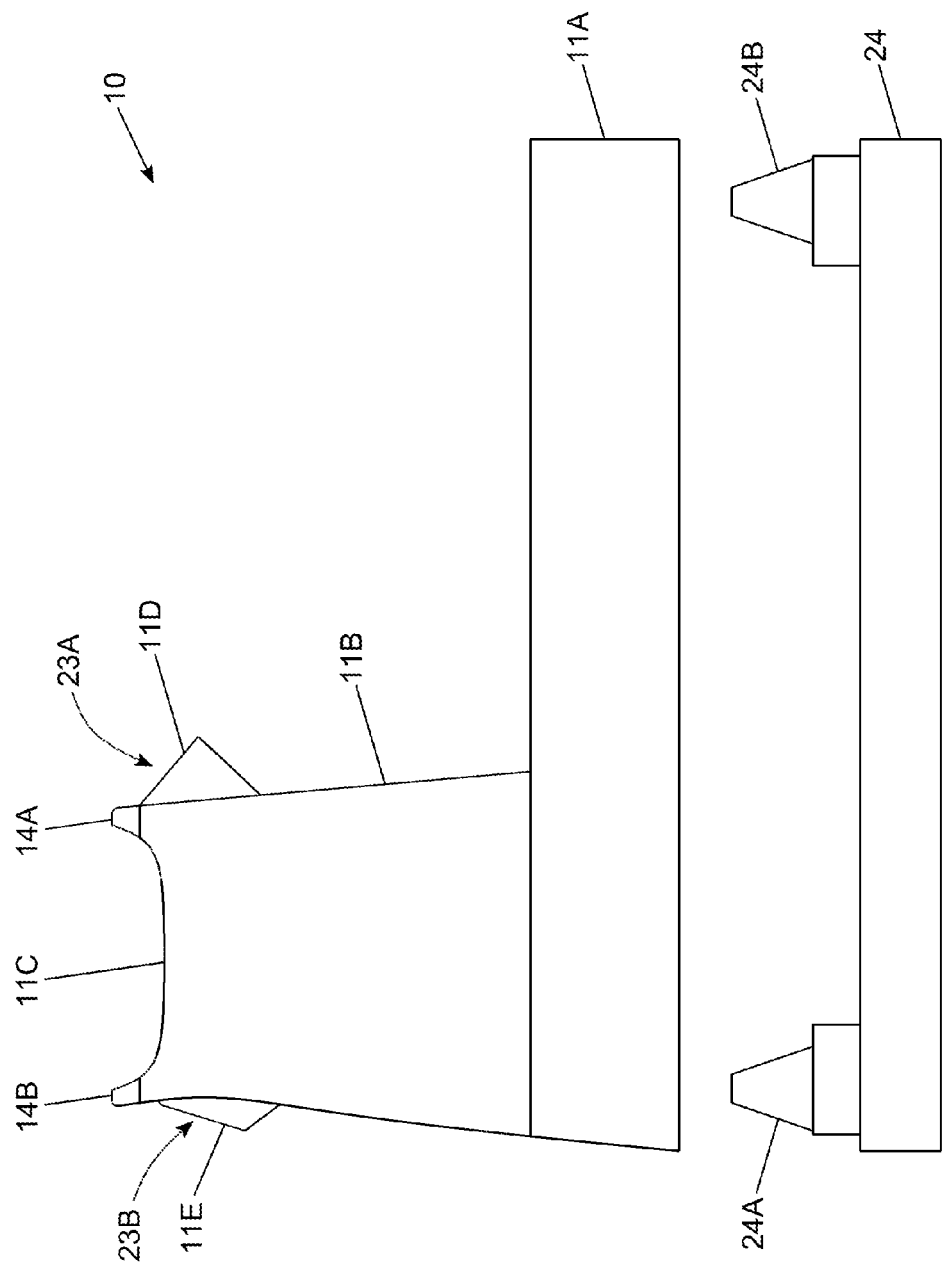

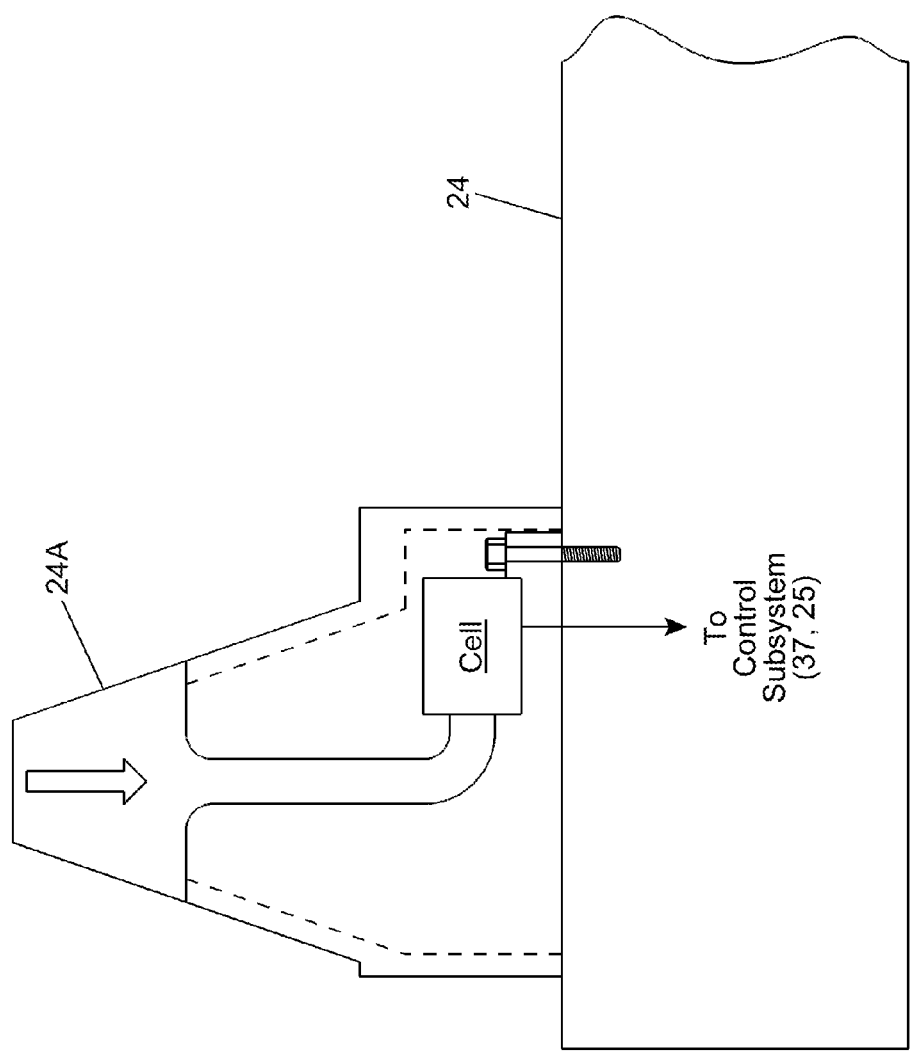

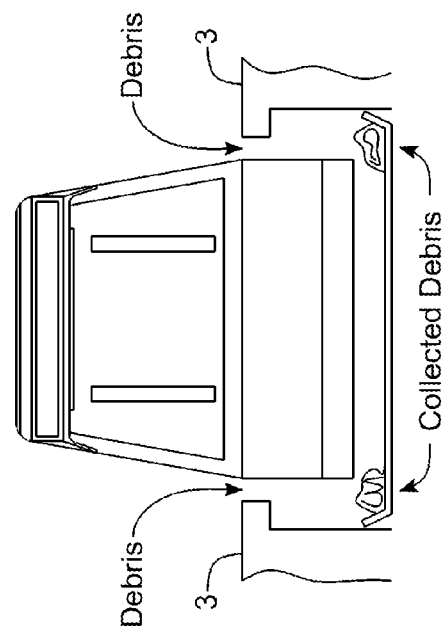
FIG. 1H2
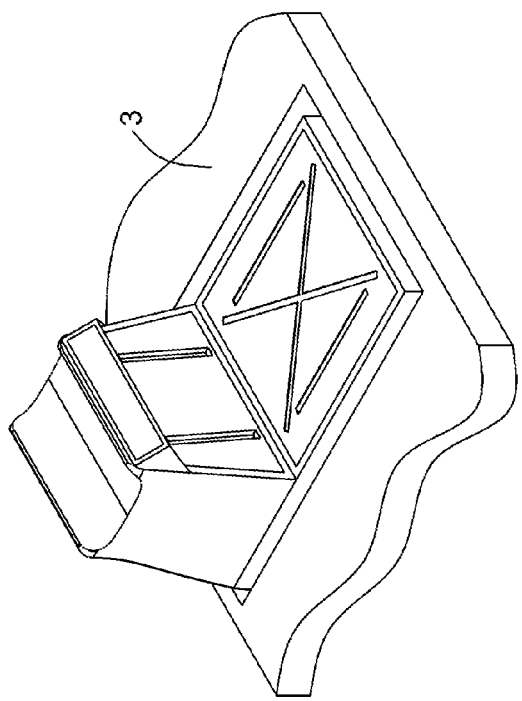
FIG. 1H1
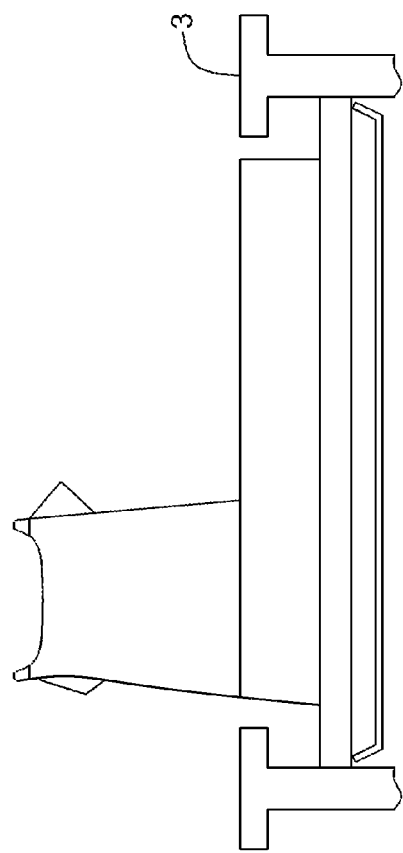
FIG. 1H3

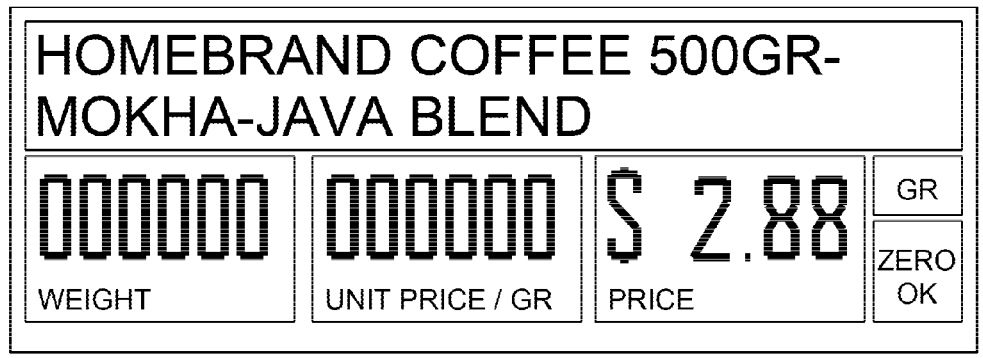
FIG. 4D1
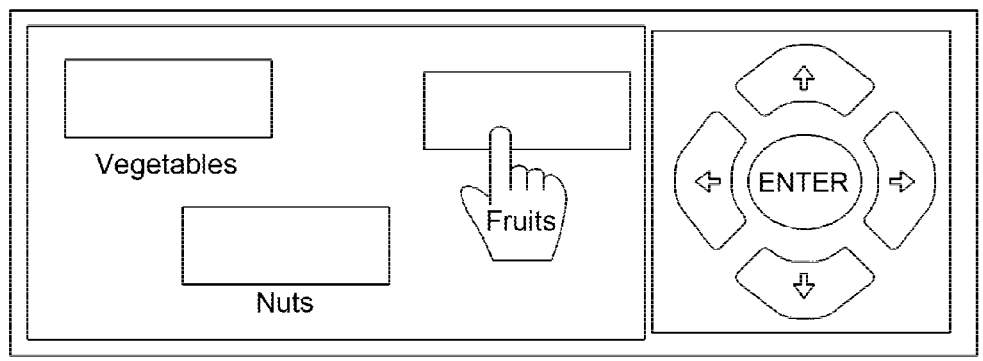
FIG. 4D2
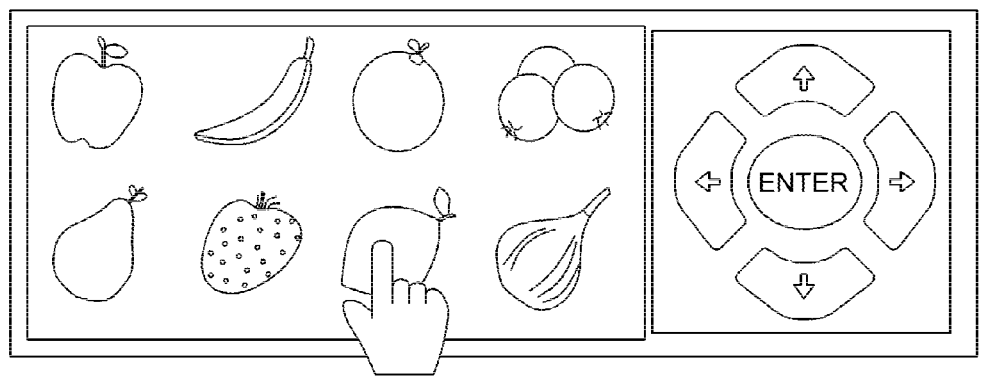
FIG. 4D3

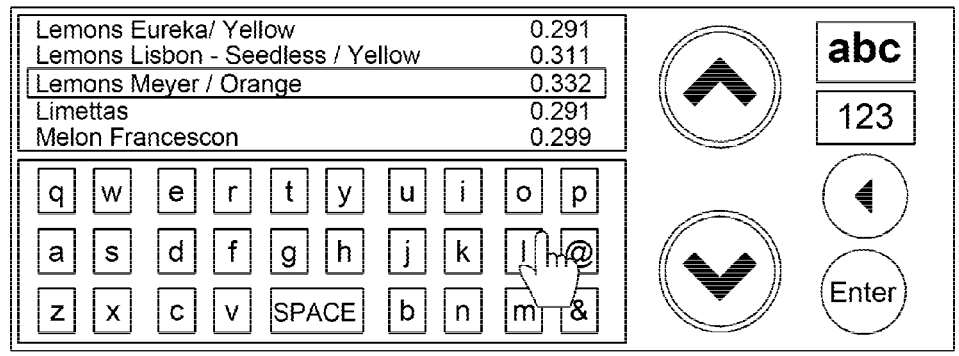
FIG. 4D4
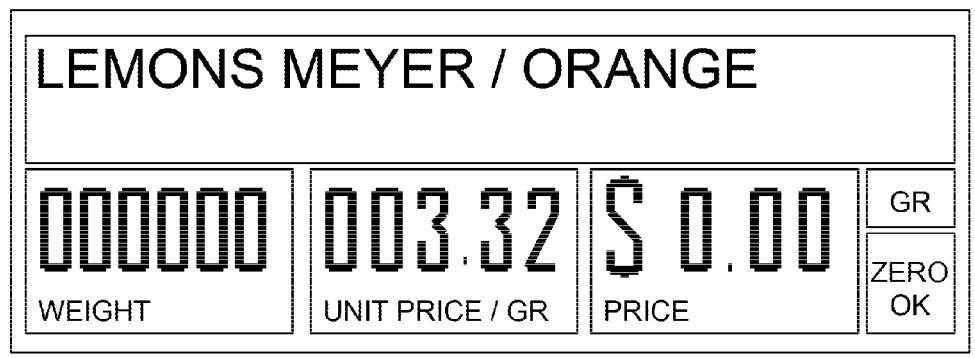
FIG. 4D5
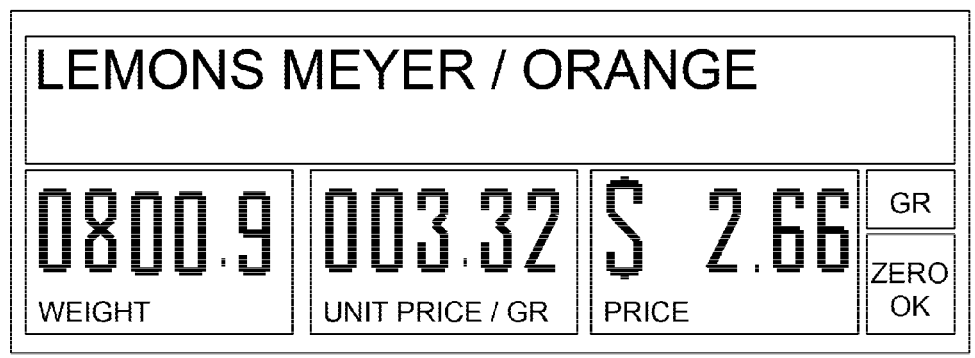
FIG. 4D6

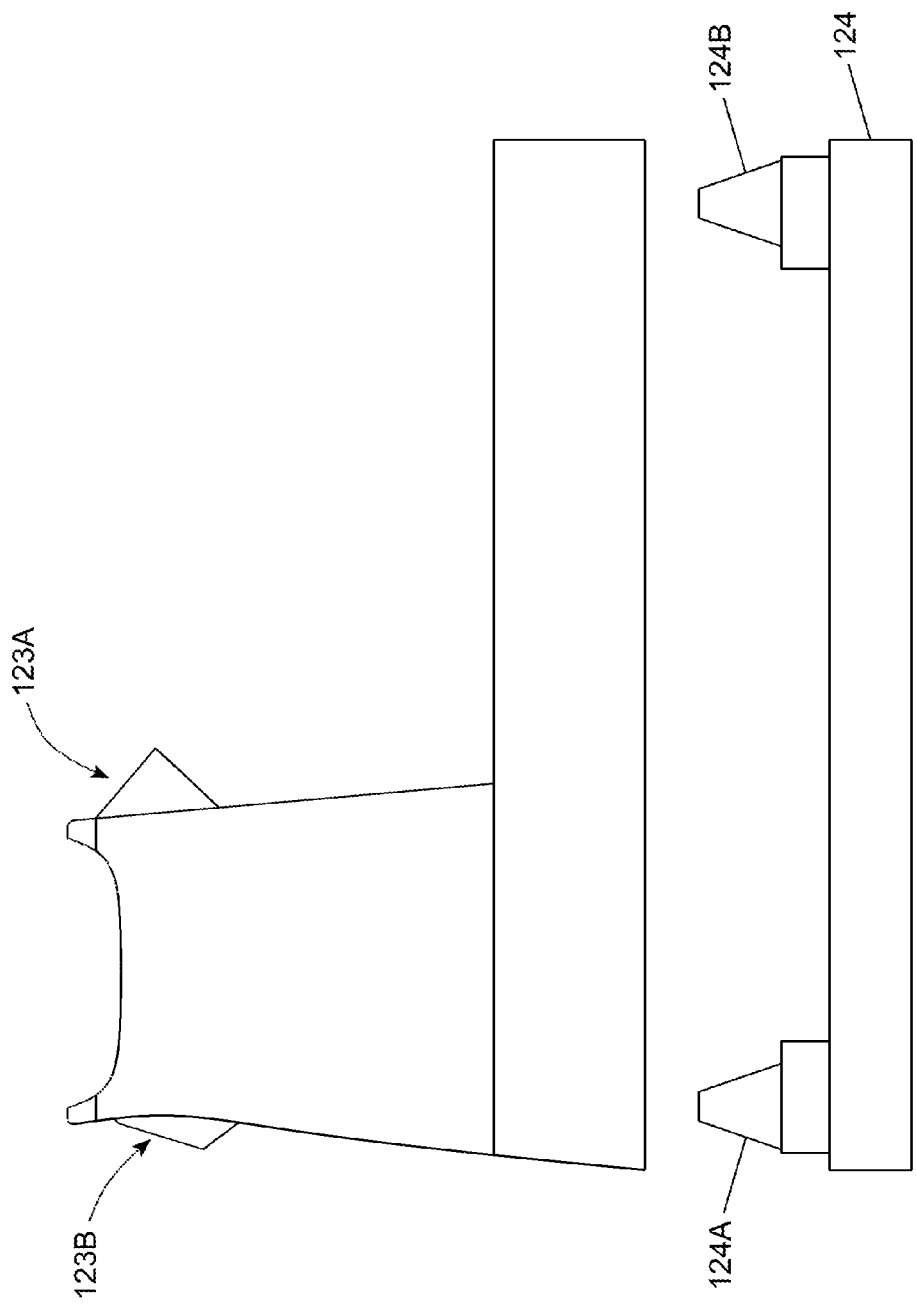

SYMBOL READING SYSTEM WITH INTEGRATED SCALE BASE

CROSS-REFERENCE TO RELATED APPLICATION

The present application claims the benefit of U.S. patent application Ser. No. 13/019,439 for a POS-Based Code Symbol Reading System with Integrated Scale Base and System Housing Having an Improved Produce Weight Capturing Surface Design filed Feb. 2, 2011 (and published Aug. 2, 2012 as U.S. Patent Application Publication No. 2012/0193407), now U.S. Pat. No. 8,789,757. Each of the foregoing patent application, patent publication, and patent is hereby incorporated by reference in its entirety.

FIELD OF DISCLOSURE

The present disclosure relates generally to improvements in methods of and apparatus for weighing produce items at point-of-sale (POS) environments.

BACKGROUND

In demanding retail environments, such as supermarkets and high-volume department stores, where high check-out throughput is critical to achieving store profitability and customer satisfaction, it is common to use laser scanning bar code reading systems having both bottom and side-scanning windows to enable highly aggressive scanner performance. In such systems, the cashier need only drag a bar coded product past these scanning windows for the bar code thereon to be automatically read with minimal assistance of the cashier or checkout personal. Such dual scanning window systems are typically referred to as "bioptical" laser scanning systems as such systems employ two sets of optics disposed behind the bottom and side-scanning windows thereof. Examples of polygon-based bioptical laser scanning systems are disclosed in U.S. Pat. Nos. 4,229,588; 4,652,732 and 6,814,292; each incorporated herein by reference in its entirety. Commercial examples of bioptical laser scanners include: the PSC 8500—6-sided laser based scanning by PSC Inc.; PSC 8100/8200, 5-sided laser based scanning by PSC Inc.; the NCR 7876—6-sided laser based scanning by NCR; the NCR7872, 5-sided laser based scanning by NCR; and the MS232x Stratos®H, and MS2122 Stratos® E Stratos 6 sided laser based scanning systems by Metrologic Instruments, Inc., and the MS2200 Stratos®S 5-sided laser based scanning system by Metrologic Instruments, Inc.

Most bi-optical laser scanning systems have integrated weight scales for measuring the weight of produce items during checkout operations. It is estimated that approximately 5% of the produce items found in supermarkets are oversized and therefore require either a larger weighing surface or other means to ensure the correct "full" weight is captured. When all of the weight is not captured for a weigh transaction, the retailer can lose money. This is referred to in the industry as "shrinkage loss". In this day and age retailers looking to reduce losses and cost and are focusing at the front end check out. Retailers are paying more attention to front end "shrinkage" and expecting their scanner/scales to provide a means to address weighing of oversized produce.

In the mid 1990's, PSC introduced its All-Weighs™ solution with their Magellan SL 5-sided scanner. The ALL-Weighs solution was carried over to their 8100, 8200, 8500 and 9500 scanner/scale models. Basically the vertical outer window and horizontal weigh platter are connected and essentially one assembly. Thus, the operators are encouraged to lean or position an oversized produce item against the vertical window. The perceived advantage of this solution is that the operator will recognize an oversized produce item and place the item against the vertical window and capture all the weight. This is not always possible since many front-end checkout counters incorporate a POS keyboard above the scanner/scale vertical section. There may be insufficient clearance above the vertical window and placing a large produce item against the vertical window may not be possible for fear of interference with the keyboard. Another disadvantage of the ALL-Weighs solution is that oversized produce (e.g. watermelon and squash) can come in round shapes that do not easily stay positioned on the All-Weighs platter. In addition the physical act of positioning a large variable weight item away from the cashier is counter-intuitive and is not ergonomically safe in respect to the operator body position and stress on the lower back.

While these systems offer improvements in produce weight capture, they suffer from the disadvantage that not all housing surfaces are effectively utilized during product weigh capture, and also that debris builds up between platter and housing, and around the load cell of the electronic weigh scale subsystem, requiring regular cleaning or resulting eventually in a malfunctioning weigh system.

As an alternative to PSC's All-Weigh Solution, Metrologic has introduced a line of bi-optical scanner/scales which offer two different scanner-dependent solutions which offer a quick and intuitive method of weighing oversized produce items.

In the first solution, the MS2320 StratosH 6-sided scanner/scale incorporates a produce weigh/roll bar that serves two functions. The weigh/roll bar prevents products or produce from rolling off the scanning/weighing surface. The produce weigh/roll bar can be used to lean, or place oversized produce, in order to capture the full weight. The weigh/roll bar solution incorporated within Metrologic's StratosH 6-sided solution.

In the second solution, the StratosS MS2220 features a flip up bar as a means of weighing oversized produce. The flip up bar is normally in a "down" position resting within the platter stainless top plate. When an oversized produce item is encountered, the cashier uses his or her finger tip to lift up the bar to its "up" position where the produce can be rested to capture the full weight.

While these systems offer improvements in produce weight capture, they also suffer from the disadvantage that not all system housing surfaces are effectively utilized during product weigh capture, and also that debris builds up between platter and housing, and around the load cell of the electronic weigh scale subsystem, requiring regular cleaning or resulting eventually in a malfunctioning weigh system.

While various integrated weigh-scale solutions are currently available to weigh oversized produce and minimize shrinkage, there is still a great need in the art for an improved system and method which avoids the shortcomings and drawbacks of prior art systems and methodologies.

SUMMARY

Accordingly, a primary object of the present disclosure is to provide an improved optical scanner with an integrated weigh-scale for use in POS environments, which is free of the shortcomings and drawbacks of prior art systems and methodologies.

Another object is to provide a point of sale (POS) based system for optically reading code symbols on objects and weighing produce items in retail store environments.

Another object of the present disclosure is to provide such a POS-based system, wherein an electronic weigh scale subsystem is integrated into a code symbol reading systems.

Another object of the present disclosure is to provide a unique system housing having an improved produce weight capturing surface design, which allows the system operator (e.g. cashier) more options and greater flexibility when weighing produce items at the POS checkout station.

Another object of the present disclosure is to provide such a POS-based system with a convex weigh surface that is integrated with the vertical portion of the system housing portion, for supporting the weight of produce items supported thereon during weighing operations.

Another object of the present disclosure is to provide such a POS-based system with an electronic weigh scale subsystem including a base portion having a plurality of load cells for (i) supporting a support frame and a system housing supported thereon, (ii) measuring the weight of produce items supported on the system housing, including produce items supported on or against the reading window(s) and produce items supported on the convex weigh surface, and (iii) producing data representative of the weight measurement of the produce items.

Another object of the present disclosure is to provide such a POS-based system, wherein the code symbol reader is a digital imaging code symbol reader, and wherein one or more imaging windows are formed in the system housing.

Another object of the present disclosure is to provide such a POS-based system, wherein the code symbol reader is a laser scanning code symbol reader, and wherein one or more scanning windows are formed in the system housing.

Another object of the present disclosure is to provide a POS-based scanning/scale system, wherein an electronic weigh scale subsystem is integrated into a code symbol reading system in a manner allowing all system housing surfaces to be effectively used during produce weight capture, while allowing debris to fall beside the POS-based system and be collected on a debris platter or drawer supported beneath the system, within the countertop furniture at the POS station.

These and other objects will become apparent hereinafter and in the Claims appended hereto.

BRIEF DESCRIPTION OF THE DRAWINGS

In order to more fully understand the Objects, the following Detailed Description of the Illustrative Embodiments should be read in conjunction with the accompanying figure Drawings in which:

FIG. 1B is a first perspective view of the POS-based imaging/weighing system shown removed from its POS environment in FIG. 1A, showing (i) produce weigh tray integrated into the top surface portion of the vertical housing section of the system, (ii) a multifunctional LCD-based touch-screen allowed to display produce weight, weight unit of measurement, product information, price information to the cashier, and collecting cashier input from dynamically projected choices with the touch of a finger; and (iii) optional aperture slots formed in the vertical and horizontal imaging windows, through which coplanar illumination and imaging planes are projected into the 3D imaging volume defined between these two imaging windows;

FIG. 1C1 is a perspective customer-facing view of a first illustrative embodiment of the POS-based imaging/weighing system of FIG. 1B, showing an angle adjustable LCD-based produce weight display panel supported on a countertop surface at a POS station, displaying produce weight, weight unit of measurement, product information, price information to the customer during produce weighing operations at the POS station, and when not the system is not performing produce weighing operations, the LCD-based produce weight display panel displays a scale zero indication, and optionally, displaying product information and price information when bar code symbols on products are being read, and not weight measuring operations are being performed;

FIG. 1C2 is a perspective customer-facing view of a second illustrative embodiment of the POS-based imaging/weighing system of FIG. 1B, showing an angle adjustable LCD-based produce weight display panel integrated into the rear surface of the system housing, displaying produce weight, weight unit of measurement, product information, price information to the customer during produce weighing operations at the POS station, and when the system is not performing produce weighing operations, the LCD-based produce weight display panel displays a scale zero indication, and optionally, displaying product information and price information when bar code symbols on products are being read, and not weight measuring operations are being performed;

FIG. 1D is an exploded top perspective view of the POS-based imaging/weighing system of FIG. 1B, showing its system housing and subassembly lifted off the four weight-bearing self centering corner posts provided on the base platform of the electronic scale subsystem;

FIG. 1E is an exploded side view of the POS-based imaging/weighing system of FIG. 1B, showing its system housing and subassembly lifted off the four weight-bearing self centering corner posts provided on the base platform of the electronic scale subsystem;

FIG. 1G is a side partially cut-away view of one of the weight-bearing self centering corner posts provided on the base platform of the electronic scale subsystem employed in the POS-based imaging/weighing system of FIG. 1B;

FIG. 1H1 is a perspective view of the POS-based imaging/weighing system of FIG. 1B, showing the debris collection feature of the system;

FIG. 1H2 is a cross-sectional cut-away end view of the POS-based imaging/weighing system of FIGS. 1B and 1H1, showing the debris collection tray of the system, beneath the support frame of the system mounted beneath the countertop surface;

FIG. 1H3 is a cross-sectional cut-away end view of the POS-based imaging/weighing system of FIGS. 1B, 1H1 and 1H2, showing the debris collection tray of the system, beneath the support frame of the system mounted beneath the countertop surface;

FIG. 3 is a schematic diagram describing an exemplary embodiment of a computing and memory architecture platform used in implementing the POS-based imaging/weighing system described in FIGS. 1A through 2B;

FIG. 4D1 is a schematic representation of a graphical user interface (GUI) screen that is displayed on the cashier LCD price/weight display panel, and customer LCD price/weight display panel, when the cashier is scanning regular bar coded products at the POS station;

FIG. 4D2 is a schematic representation of a GUI screen that is displayed on the cashier LCD price/weight display panel when the customer touches the screen, and then selects a product group (e.g. fruits) to be subsequently displayed on the GUI screen, from which the cashier can then select the produce item to be weighed;

FIG. 4D3 is a schematic representation of a GUI screen that is displayed on the cashier LCD price/weight display panel when the customer selects the product group "fruit" during the step shown in FIG. 4D2;

FIG. 4D4 is a schematic representation of a GUI screen that is displayed on the cashier LCD price/weight display panel when the customer selects the product item "lemon" during the step shown in FIG. 4D3, showing a cashier using a navigation down button to scroll down to select "Lemons Meyer/Orange", and then presses ENTER to select, but alternatively the cashier has the option to start typing LEMONS on the virtual keyboard, and after pressing '1' display all fruits starting with 'L' when pressing 'e' he sees all "fruits" starting with 'LE' etc. (and selecting BACKSPACE erases entries, and a back space after the last character has been erased, brings you to the previous screen;

FIG. 4D5 is a schematic representation of a GUI screen that is displayed on the cashier LCD price/weight display panel, and the customer LCD price/weigh display panel, before the customer places the selected product item on an scale weigh surface provided by the system, showing the customer the unit price per gross weight measured by the system;

FIG. 4D6 is a schematic representation of a GUI screen that is displayed on the cashier LCD price/weight display panel, and the customer LCD price/weigh display panel, when the customer places the selected product item on an scale weigh surface provided by the system, the scale weights the produce item and automatically calculates and displays the total purchase price on the display panel;

FIG. 5G is an exploded side perspective view of the POS-based scanning/weighing system of FIG. 5A, showing its system housing and subassembly lifted off the four weight-bearing corner posts provided on the base platform of the electronic scale subsystem;

FIG. 6 is a block schematic representation of the POS-based scanning/weighing system of FIG. 5A, wherein a pair of laser and/or imaging scanning stations support automatic laser and/or imaging scanning of products and produce items bearing bar code symbols being transported through a 3D scanning volume defined between the vertical and horizontal scanning windows of the system;

DETAILED DESCRIPTION

Figure 1A:
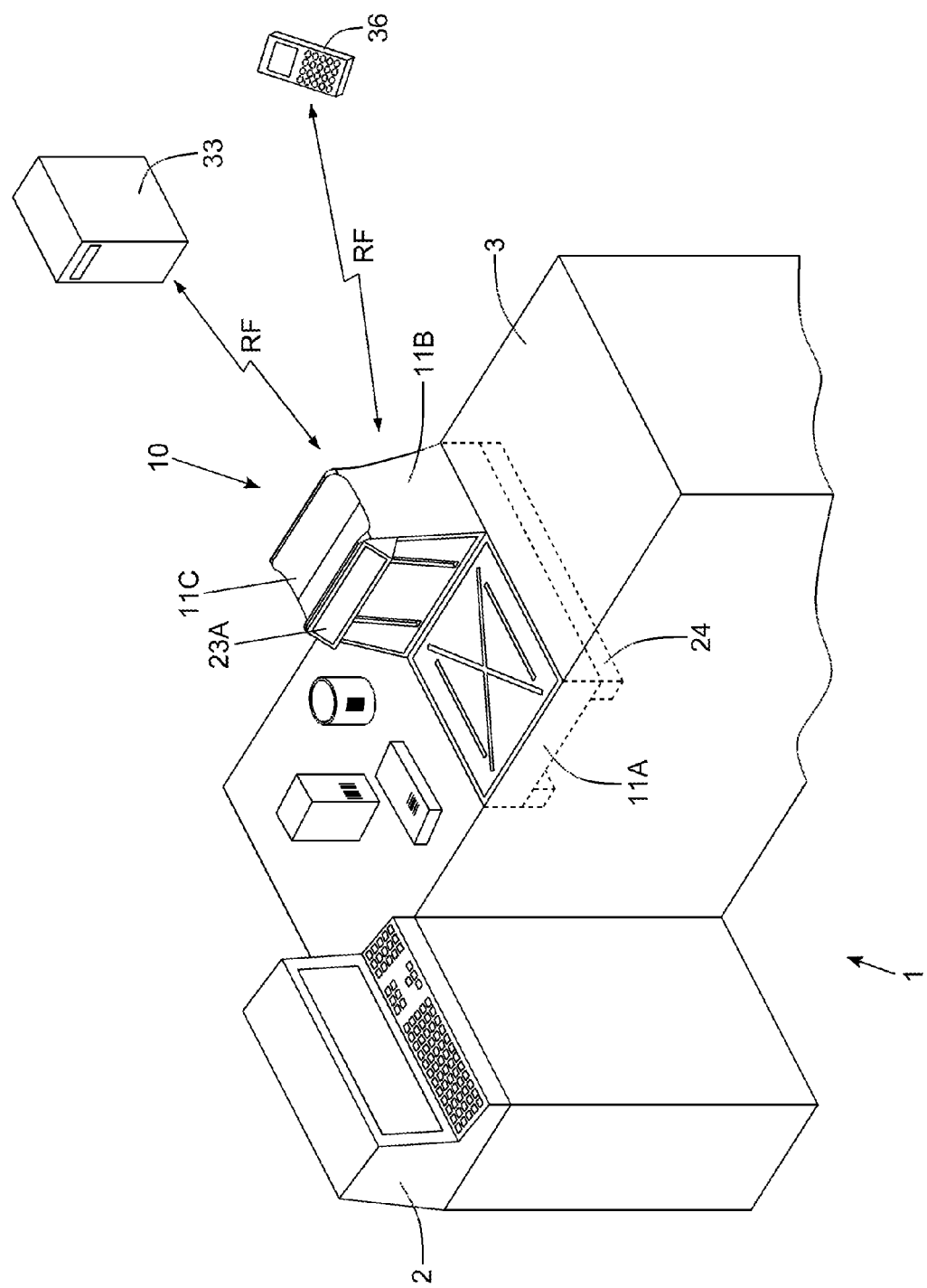
FIG. 1A is a perspective view of a retail point of sale (POS) station employing a POS-based digital imaging system having an integrated electronic weight scale (i.e. POS-based imaging/weighing system) installed in the countertop surface of the POS station.

Referring to the figures in the accompanying Drawings, the various illustrative embodiments of the apparatus and methodologies will be described in great detail, wherein like elements will be indicated using like reference numerals.

An integrated electronic weigh scale subsystem is integrated into digital-imaging and laser-scanning based code symbol reading systems, having a unique system housing with an improved produce weight capturing surface design, and system architecture which provides a debris collection subsystem, which will be described and illustrated in greater technical detail hereinafter.

Specification of an Illustrative Embodiment of a POS-Based Imaging/Weighing System As shown in FIG. 1B, the POS-based imaging/weighing system 10 includes a system housing 11 having a horizontal or bottom housing portion 11A with a horizontal optically transparent (glass) imaging window 12A, and a vertical or upper housing portion 11B with a vertical optically transparent (glass) imaging window 12B, arranged in a substantially orthogonal with respect to the horizontal imaging window 12A. As shown, each imaging window is covered by an imaging window protection plate 13A, 13B provided with a pattern of apertures 14A, 14B, respectively, which permit the projection of a plurality of coplanar illumination and imaging planes 16 from a complex of coplanar illumination and imaging stations 15A through 15G installed beneath the system housing 11, as shown and described in greater detail in U.S. Pat. Nos. 7,819,326 and 7,661,597, incorporated herein by reference.

As shown in FIG. 1B, the system housing 11 has a top surface portion 11C which is parallel to the horizontal imaging window 12A, and has a convex geometry to support a diverse group of produce objects within its convex surface geometry, to prevent rolling thereof, during weighing operations. This surface geometry feature of the system housing, and its advantages during produce weighing operations, which will be described and illustrated in greater detail hereinafter with reference to FIGS. 4A, 4B and 4C.

Figure 1F:
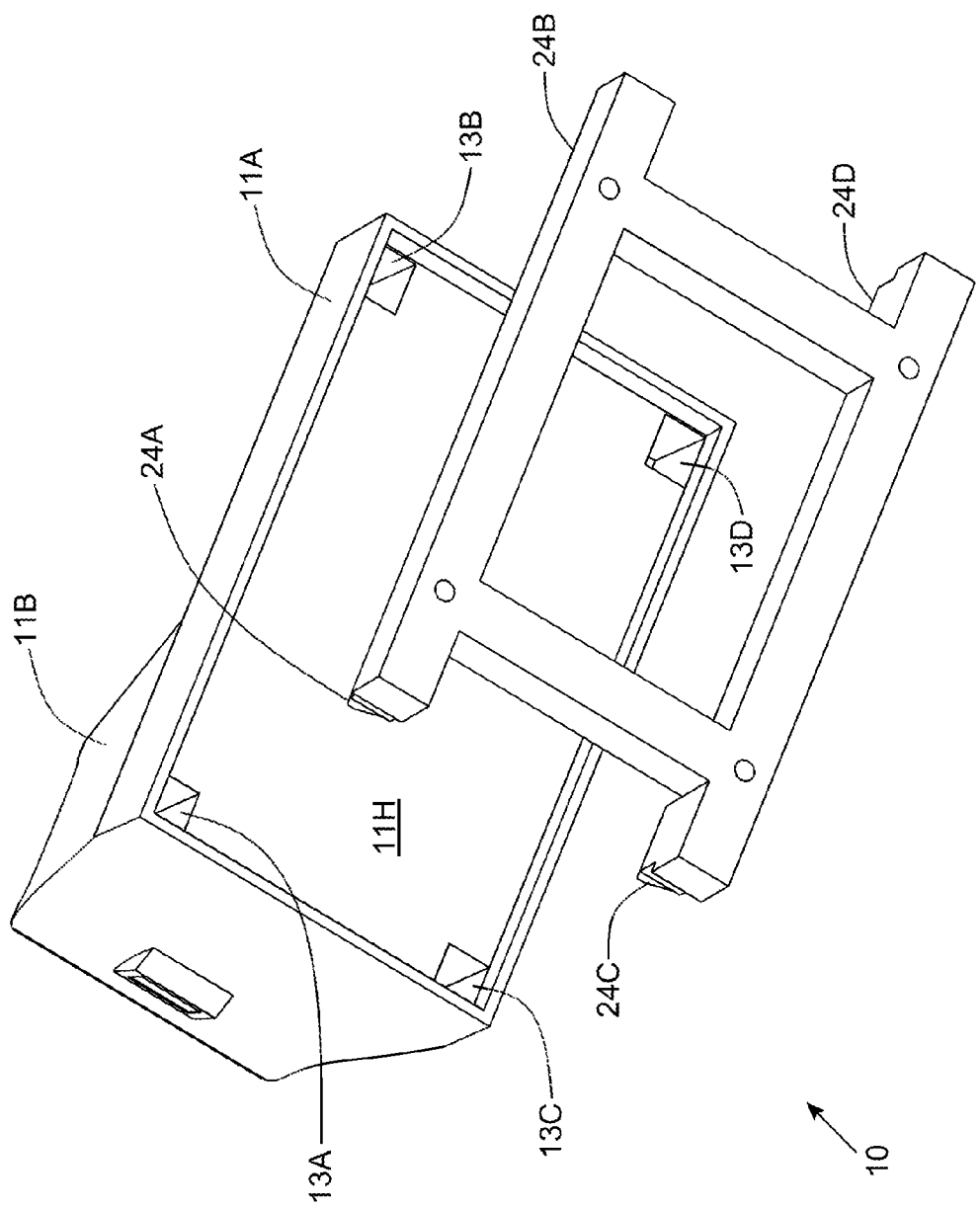
FIG. 1F is an exploded underneath perspective view of the POS-based imaging/weighing system of FIG. 1B, showing its system housing and subassembly lifted off the four weight-bearing corner posts provided on the base platform of the electronic scale subsystem.

As shown in FIG. 1F, the system housing 11 also includes a support frame 11H supporting the system housing, and having a plurality of spaced apart support surface 13A through 13D. In the illustrative embodiment, support frame 11H can also serve as an optical bench supporting the electro-optical and other components associated with the coplanar illumination and imaging subsystems 15.

Also, shown in FIG. 1E the system housing has a planar flange structure 11D which extends out from a first extreme edge 14A of the system housing, at an adjustable incline angle with respect to the countertop surface 3 in which the system is mounted. The purpose of this adjustable planar flange structure is to accommodate for cashier sitting as well as cashiers of various lengths standing up while operating the POS system, and support an LCD-based touch screen produce price/weight display panel 23A, used by the cashier during checkout operations.

As shown in FIG. 1, extending from location close to a second extreme edge 14B of the system housing, parallel to the first extreme edge 14A, is a smaller planar flange structure 11E, also adjustably inclined at about a 45 degree with respect to the countertop surface in which the system is mounted. This planar flange structure 11E supports a detachable and angle adjustable LCD-based produce weight display panel 23B for displaying produce weight, weight unit of measurement, product information, price information to the customer being weighed by the cashier during checkout operations by the cashier during checkout operations at the POS station, as shown in FIGS. 1C2. Also, when the system is not being operated in its produce weighing operation, the LCD-based produce weight display panel 23B displays a scale zero indication, and optionally, displays product information and price information when reading code symbols on consumer products for which no weight measurement is required.

In an alternative embodiment shown in FIG. 1C1, the display panel 23B can be supported in display housing 111F supported on a pole stand mounted on the countertop adjacent the POS-based system, for the purpose of displaying price and weight information to the customer while facing the cashier at the POS-based system.

In general, the LCD touch-screen display panel 23A will display "function buttons" on its touch-screen surface, allowing the cashier to reset and to zero calibrate the integrated electronic weigh scale subsystem, and allowing maintenance engineers to access the scale configuration menu. The same display panel can additionally display buttons for other configurable functionalities such as adjusting beeper tone, adjusting volume, and the like.

Once the integrated code symbol reading subsystem, or an auxiliary connected hand-held scanner, reads a code symbol related to a specific produce item, the product identification number encoded in the code symbol on the product/produce-item is transmitted to the host system via a retail LAN/WAN. The host system returns the price, or price per unit weight and product information. In the event the produce item requires a produce weight measurement, the system controller automatically triggers the integrated electronic weigh scale subsystem, and generates an audible distinctive sound, notifying the cashier. The touch-screen display panel 23A displays product information and its price per unit weigh.

When a non-produce product is scanned, the integrated code symbol reading subsystem produces price/product information which is automatically displayed on the cashier's LCD touch-screen display panel 23A, and on the LCD produce price/weight display panel 23B, mounted on the customer's side of the POS-based system. When a produce-item product is scanned, requiring weighing, then the system produces price/product information which is automatically displayed on both the cashier's LCD touch-screen display panel 23A, and the LCD produce price/weight display panel 23B, mounted on the customer's side of the POS-based system. This dual cashier/customer display functionality ensures that both the customer and cashier are aware of the price information being used in the produce weight measurement. It also provides an opportunity for the cashier and customer to validate that the scale is properly zero calibrated. Product information can be provided as text only, but may also include a prerecorded produce image available on the host system.

Figure 6:
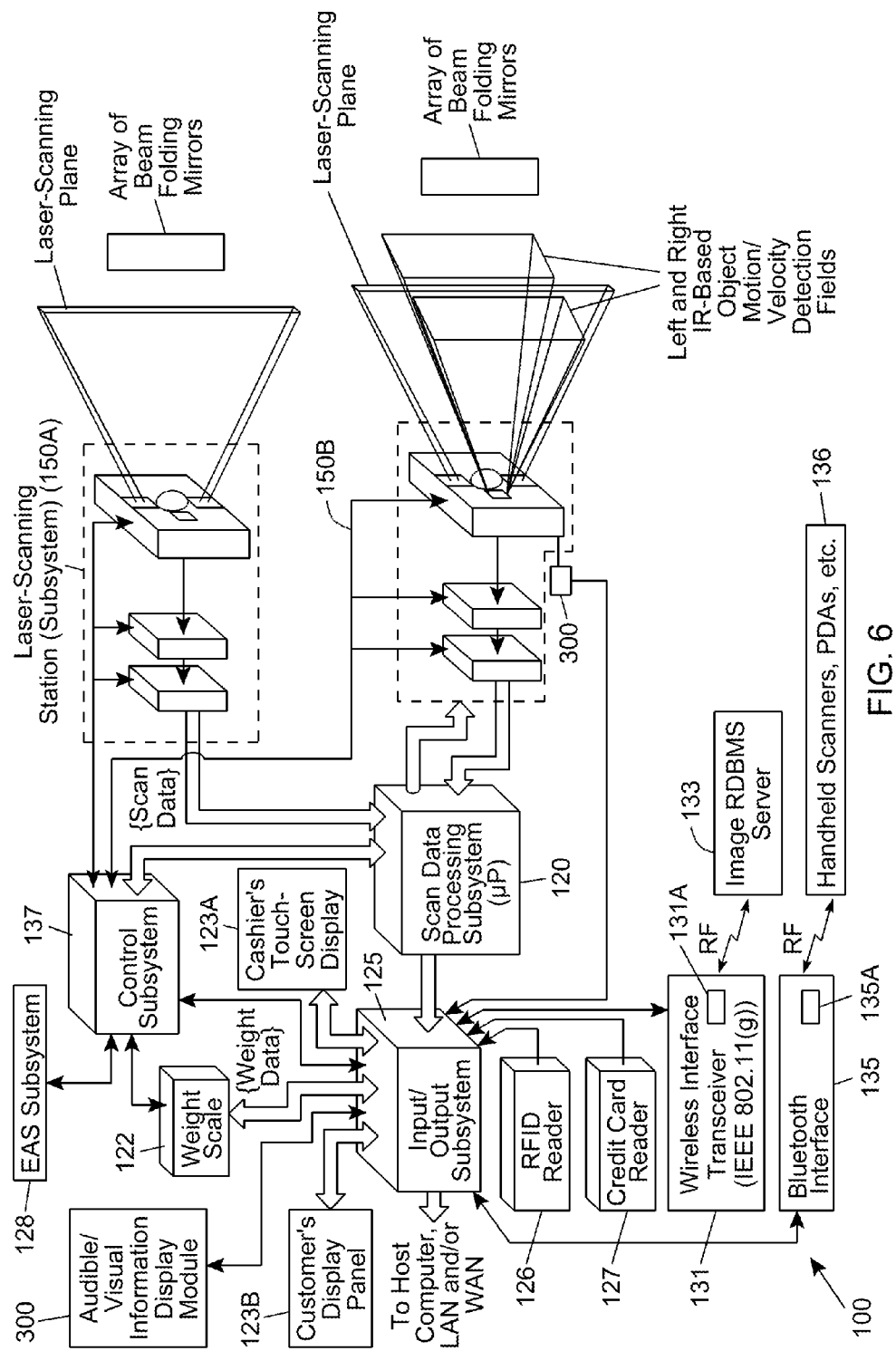

In applications where the POS host system on the store's LAN/WAN has no price per unit weight information for the produce item, or the produce item has no code symbol, the POS-based system optionally allows the cashier's LCD touch-screen display panel 23A to display a menu structure to retrieve the price per unit for a produce item or group of produce items. Preferably, the menu structure comprises (i) graphical icons or representations of a predefined produce item or produce groups, allowing a narrowing of the search field criteria, (ii) a soft input panel where, by entering the alphabetic characters of the produce name, it displays more relevant predefined records by every character that has been entered. FIGS. 4D1 through 4D6 illustrate a set of GUI screens that might be displayed on the LCD touch-screen display panel 23A during an illustrative embodiment, to realize such a menu structure on the POS-based system of the present disclosure.

FIG. 4D1 shows a GUI screen that is displayed on the cashier LCD price/weight display panel, and customer LCD price/weight display panel, when the cashier is scanning regular bar coded products at the POS station. FIG. 4D2 shows a GUI screen that is displayed on the cashier LCD price/weight display panel when the customer touches the screen, and then selects a product group (e.g. fruits) to be subsequently displayed on the GUI screen, from which the cashier can then select the produce item to be weighed. FIG. 4D3 shows a GUI screen that is displayed on the cashier LCD price/weight display panel when the customer selects the product group "fruit" during the step shown in FIG. 4D2. FIG.

4D4 shows a GUI screen that is displayed on the cashier LCD price/weight display panel when the customer selects the product item "lemon" during the step shown in FIG. 4D3. As shown, the cashier uses a navigation down button to scroll down to select "Lemons Meyer/Orange", and then presses ENTER to select, but alternatively the cashier has the option to start typing LEMONS on the virtual keyboard, and after pressing '1' display all fruits starting with 'L' when pressing 'e' he sees all "fruits" starting with 'LE' etc. (and selecting BACKSPACE erases entries, and a back space after the last character has been erased, brings you to the previous screen. FIG. 4D5 shows a GUI screen that is displayed on the cashier LCD price/weight display panel, and the customer LCD price/weigh display panel, before the customer places the selected product item on a scale weigh surface provided by the system, showing the customer the unit price per gross weight measured by the system. FIG. 4D6 shows a GUI screen that is displayed on the cashier LCD price/weight display panel, and the customer LCD price/weigh display panel, when the customer places the selected product item on an scale weigh surface provided by the system, the scale weights the produce item and automatically calculates and displays the total purchase price on the display panel.

LCD touch-screen display panel 23A and/or LCD panel 23B can be realized in many different ways well known in the art.

Other useful techniques which can be practiced on the POS-based imaging/weighing system 10 are disclosed is U.S. Pat. Nos. 7,841,524 and 7,753,269, incorporated herein by reference.

Figure 2A:
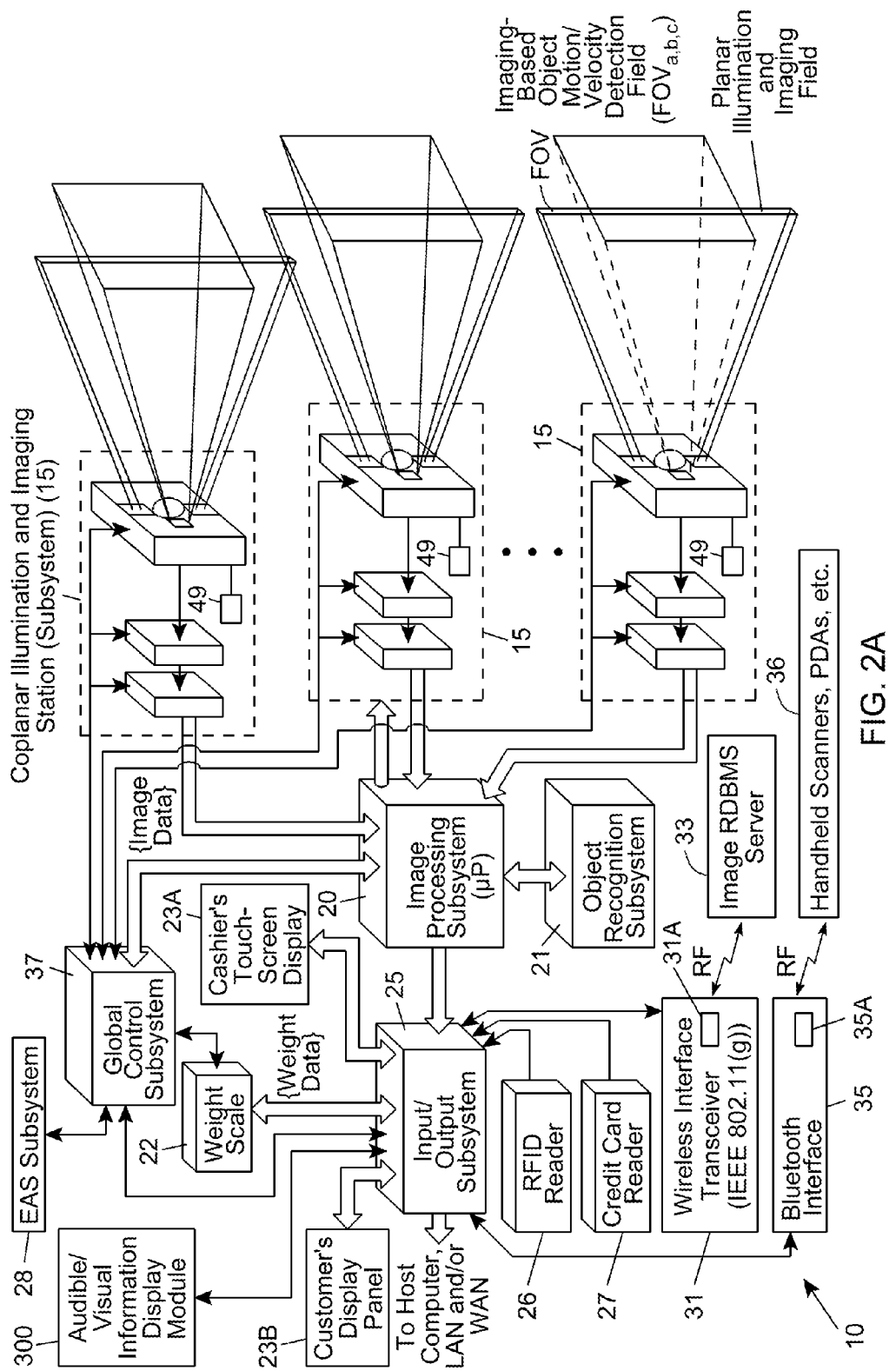
FIG. 2A is a block schematic representation of the POS-based imaging/weighing system shown in FIGS. 1A and 1B, wherein a complex of coplanar illuminating and linear imaging stations provided within the system housing support (i) automatic image formation and capture of products bearing bar code symbols intersected by any one or more of a complex of coplanar illumination and imaging planes projected within the 3D imaging volume of the system, and (ii) imaging-based object motion/velocity sensing and intelligent automatic illumination control within the 3D imaging volume.
Figure 3:
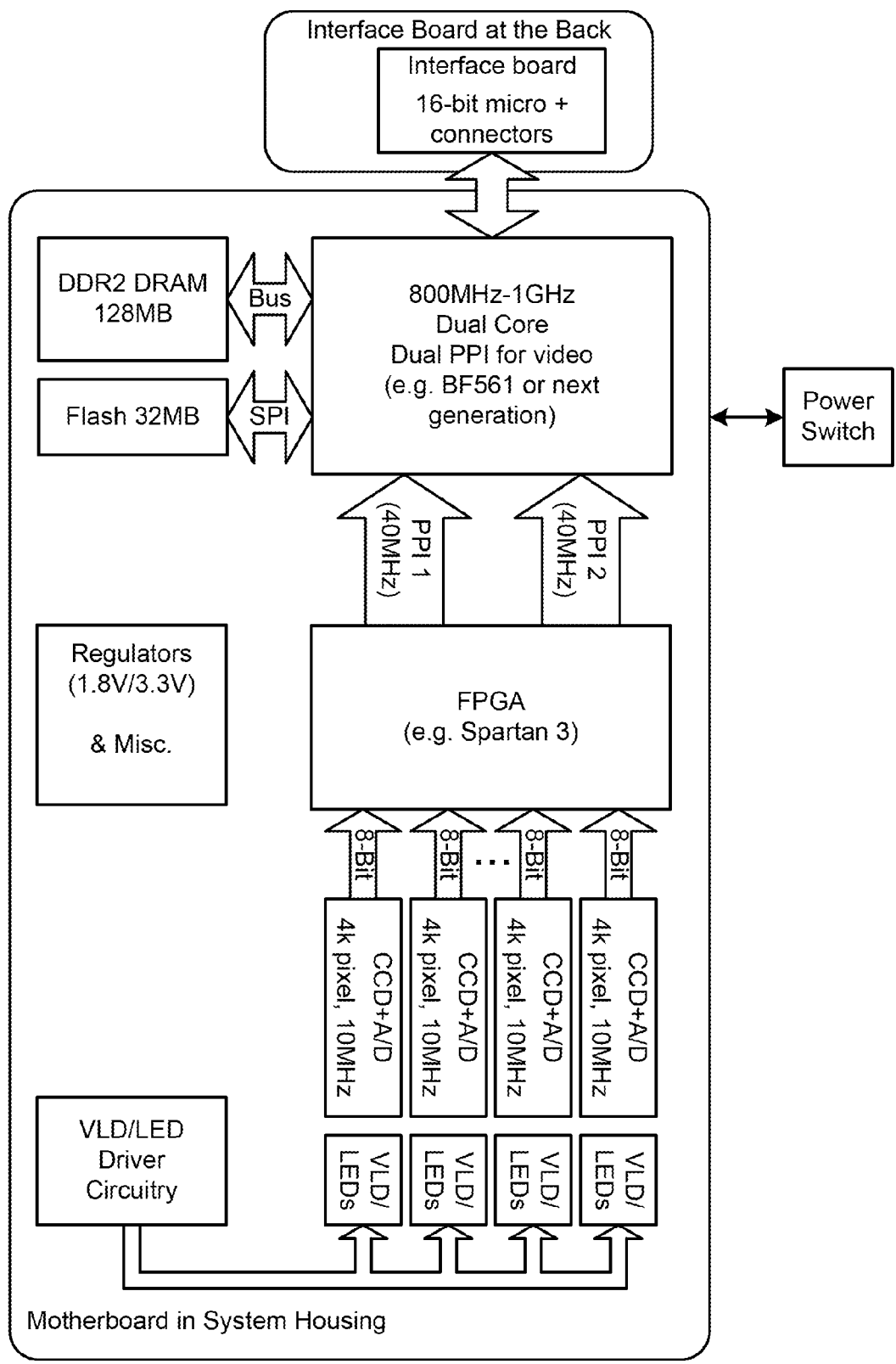

As shown in the system diagram of FIG. 2A, system 10 generally comprises: a complex of coplanar illuminating and linear imaging stations (15A through 15G), each constructed using the illumination arrays and linear image sensing array technology; an multi-processor multi-channel image processing subsystem 20 for supporting automatic image processing based bar code symbol reading and optical character recognition (OCR) along each coplanar illumination and imaging plane, and corresponding data channel within the system; a software-based object recognition subsystem 21, for use in cooperation with the image processing subsystem 20, and automatically recognizing objects (such as vegetables and fruit) at the retail POS while being imaged by the system; an electronic weigh scale 22 employing four load cells 23A through 23D positioned at each corner of a scale base 24, for supporting the lower portion of the system housing in matched recesses 13A through 13D, for the purpose of rapidly measuring the weight of objects positioned on the window aperture of the system, on the convex weigh surface 11C, or against any surface of the system housing, and automatically generating electronic data representative of measured weight of the objects; an input/output subsystem 25 for interfacing with the image processing subsystem 20, the electronic weight scale 22, RFID reader 26, credit-card reader 27, Electronic Article Surveillance (EAS) Subsystem 28 (including a Sensormatic® EAS tag deactivation block 29 integrated in system), and an audible/visual information display subsystem (i.e. module) 300 for visually and/or audibly displaying indications to assist the cashier in optimizing scanning and checkout speed, and thus improve worker productivity.

The primary function of each coplanar illumination and imaging 15 is to capture digital linear (1D) or narrow-area images along the field of view (FOV) of its coplanar illumination and imaging planes using laser or LED-based illumination, depending on the system design. These captured digital images are then buffered, and decode-processed using linear (1D) type image capturing and processing based bar code reading algorithms, or can be assembled together and buffered to reconstruct 2D images for decode-processing using 1D/2D image processing based bar code reading techniques, as taught in Applicants' U.S. Pat. No. 7,028,899 B2, incorporated herein by reference. Also, the complex of coplanar and/or coextensive illuminating and imaging stations can be constructed using (i) VLD-based and/or LED-based illumination arrays and linear and/or area type image sensing arrays, and (ii) real-time object motion/velocity detection technology embedded within the system architecture. The resulting POS-based imaging/weighing system 10 enables: (1) intelligent automatic illumination control within the 3D imaging volume of the system; (2) automatic image formation and capture along each coplanar illumination and imaging plane therewithin; (3) weighing of produce items supported anywhere on the weight-bearing surfaces of the system housing; and (4) advanced automatic image processing operations supporting diverse kinds of value-added information-based services delivered in diverse end-user environments, including retail POS and industrial environments.

In general, each coplanar illumination and imaging station 15 is able to automatically change its state of operation from object motion and velocity detection to bar code reading in response to automated detection of an object with at least a portion of the FOV of its coplanar illumination and imaging plane. By virtue of this feature, each coplanar illumination and imaging station in the system is able to automatically and intelligently direct LED or VLD illumination at an object only when and for so long as the object is detected within the FOV of its coplanar illumination and imaging plane. This intelligent capacity for local illumination control maximizes illumination being directed towards objects to be imaged, and minimizes illumination being directed towards consumers or the system operator during system operation in retail store environments, in particular.

In order to support automated object recognition functions (e.g. vegetable and fruit recognition) at the POS environment, image capturing and processing based object recognition subsystem 21 (i.e. including Object Libraries etc.) cooperates with the multi-channel image processing subsystem 20 so as to (i) manage and process the multiple channels of digital image frame data generated by the coplanar illumination and imaging stations 15, (ii) extract object features from processed digital images, and (iii) automatically recognize objects at the POS station which are represented in the Object Libraries of the object recognition subsystem 21.

While laser illumination (e.g. VLD) sources have many advantages for generating coplanar laser illumination planes for use in the image capture and processing systems (i.e. excellent power density and focusing characteristics), it is understood that speckle-pattern noise reduction measures will need to be practiced in most applications. In connection therewith, the advanced speckle-pattern noise mitigation methods and apparatus disclosed in Applicants' U.S. Pat. No. 7,028,899 B2, incorporated herein by reference in its entirety as if fully set forth herein, can be used to substantially reduce speckle-noise power in digital imaging systems employing coherent illumination sources.

In contrast, LED-based illumination sources can also be used as well to generate planar illumination beams (planes) for use in the image capture and processing systems. Lacking high temporal and spatial coherence properties, the primary advantage associated with LED technology is lack of speckle-pattern noise. Some significant disadvantages with LED technology are the inherent limitations in focusing characteristics, and power density generation. Many of these limitations can be addressed in conventional ways to make LED arrays suitable for use in the digital image capture and processing systems and methods.

In some embodiments, it may be desired to use both VLD and LED based sources of illumination to provide hybrid forms of illumination within the imaging-based bar code symbol reading systems.

Figure 2B:
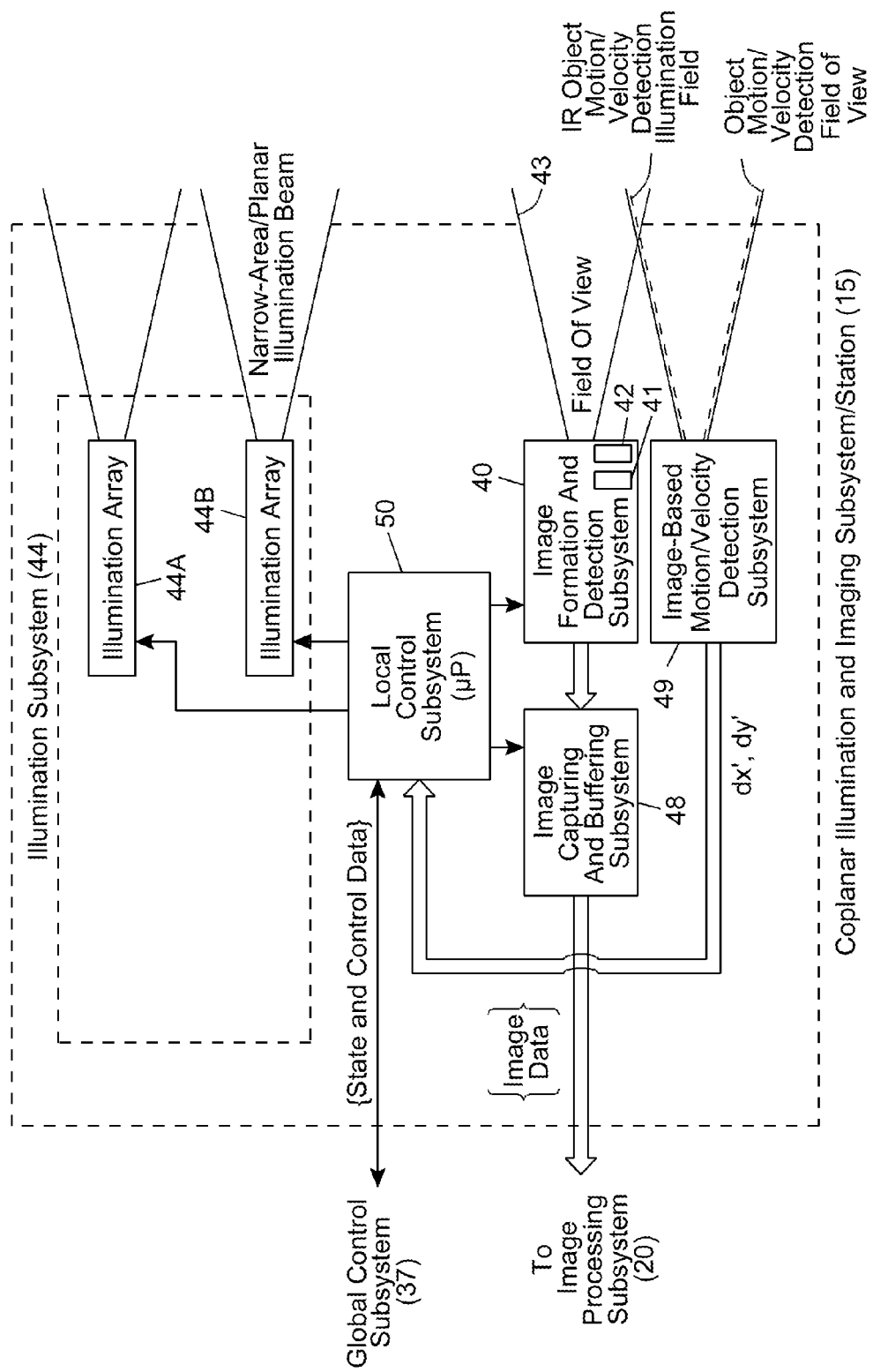
FIG. 2B is a block schematic representation of one of the coplanar illumination and imaging stations employed in the POS-based imaging/weighing system of FIGS. 1A and 1B, showing its planar illumination array (PLIA), its linear image formation and detection subsystem, its image capturing and buffering subsystem, its high-speed imaging based object motion/velocity detecting (i.e. sensing) subsystem, and its local control subsystem.

In FIG. 2B, the bar code symbol reading module employed along each channel of the multi-channel image processing subsystem 20 can be realized using SwiftDecoder® Image Processing Based Bar Code Reading Software from Omniplanar Corporation, New Jersey, or any other suitable image processing based bar code reading software. Also, the system 10 provides full support for (i) dynamically and adaptively controlling system control parameters in the digital image capture and processing system, as disclosed and taught in Applicants' U.S. Pat. Nos. 7,607,581 and 7,464,877 as well as (ii) permitting modification and/or extension of system features and function, as disclosed and taught in U.S. Pat. No. 7,708,205, each said patent being incorporated herein by reference.

As shown in FIG. 2C, an array of VLDs or LEDS can be focused with beam shaping and collimating optics so as to concentrate their output power into a thin illumination plane which spatially coincides exactly with the field of view of the imaging optics of the coplanar illumination and imaging station, so very little light energy is wasted. Each substantially planar illumination beam (PLIB) can be generated from a planar illumination array (PLIA) formed by a plurality of planar illumination modules (PLIMs) using either VLDs or LEDs and associated beam shaping and focusing optics, taught in greater technical detail in Applicants U.S. Pat. Nos. 6,898,184, and 7,490,774, each incorporated herein by reference in its entirety. Preferably, each planar illumination beam (PUB) generated from a PLIM in a PLIA is focused so that the minimum width thereof occurs at a point or plane which is the farthest object (or working) distance at which the system is designed to capture images within the 3D imaging volume of the system, although this principle can be relaxed in particular applications to achieve other design objectives.

As shown in FIG. 2C, each coplanar illumination and imaging station 15 employed in system 10 comprises: an illumination subsystem 44 including a linear array of VLDs or LEDs 45 and associated focusing and cylindrical beam shaping optics (i.e. planar illumination arrays PLIAs), for generating a planar illumination beam (PLIB) 61 from the station; a linear image formation and detection (IFD) subsystem 40 having a camera controller interface (e.g. realized as a field programmable gate array or FPGA) for interfacing with the local control subsystem 50, and a high-resolution linear image sensing array 41 with optics 42 providing a field of view (FOV) 43 on the image sensing array that is coplanar with the PUB produced by the linear illumination array 45, so as to form and detect linear digital images of objects within the FOV of the system; a local control subsystem 50 for locally controlling the operation of subcomponents within the station, in response to control signals generated by global control subsystem 37 maintained at the system level, shown in FIG. 2A; an image capturing and buffering subsystem 48 for capturing linear digital images with the linear image sensing array 41 and buffering these linear images in buffer memory so as to form 2D digital images for transfer to image-processing subsystem 20 maintained at the system level, as shown in FIG. 3B, and subsequent image processing according to bar code symbol decoding algorithms, OCR algorithms, and/or object recognition processes; a high-speed image capturing and processing based motion/velocity sensing subsystem 49 for motion and velocity data to the local control subsystem 50 for processing and automatic generation of control data that is used to control the illumination and exposure parameters of the linear image formation and detection system within the station. Details regarding the design and construction of planar illumination and imaging module (PLIIMs) can be found in Applicants' U.S. Pat. No. 7,028,899 B2, incorporated herein by reference.

In an illustrative embodiment, the high-speed image capturing and processing based motion/velocity sensing subsystem 49 may comprise the following components: an area-type image acquisition subsystem with an area-type image sensing array and optics for generating a field of view (FOV) that is preferably spatially coextensive with the longer dimensions of the FOV 43 of the linear image formation and detection subsystem 40; an area-type (IR) illumination array for illuminating the FOV of motion/velocity detection subsystem 49; and an embedded digital signal processing (DSP) image processor, for automatically processing 2D images captured by the digital image acquisition subsystem. The DSP image processor processes captured images so as to automatically abstract, in real-time, motion and velocity data from the processed images and provide this motion and velocity data to the local control subsystem 50 for the processing and automatic generation of control data that is used to control the illumination and exposure parameters of the linear image formation and detection system within the station.

In the illustrative embodiment shown in FIGS. 2A and 2B, each image capturing and processing based motion/velocity sensing subsystem 49 continuously and automatically computes the motion and velocity of objects passing through the planar FOV of the station, and uses this data to generate control signals that set the frequency of the clock signal used to read out data from the linear image sensing array 41 employed in the linear image formation and detection subsystem 40 of the system. The versions of the image capturing and processing based motion/velocity sensing subsystem 49 are schematically illustrated in U.S. Pat. No. 7,540,424 incorporated herein by reference.

The image capturing and processing based motion/velocity detection subsystem 49 employs either a linear-type or area-type of image sensing array to capture images of objects passing through the FOV of the image formation and detection subsystem. Then, DSP-based image processor computes motion and velocity data regarding object(s) within the FOV of the linear image formation and detection (IFD) subsystem 40, and this motion and velocity data is then provided to the local subsystem controller 50 so that it can generate (i.e. compute) control data for controlling the frequency of the clock signal used in reading data out of the linear image sensing array of the image formation and detection subsystem. The frequency control algorithm described in U.S. Pat. No. 7,540,424, supra, can be used to control the clock frequency of the linear image sensing array 41 employed in the IFD subsystem 40 of the system.

When any one of the coplanar illumination and imaging stations is configured in its object motion/velocity detection state, there is the need to illuminate to control the illumination that is incident upon the image sensing array employed within the object motion/velocity detector subsystem 49. In general, there are several ways to illuminate objects during the object motion/detection mode (e.g. ambient, laser, LED-based, monochrome, spectral), and various illumination parameters can be controlled while illuminating objects being imaged by the image sensing array 41 of the object motion/velocity detection subsystem 49 employed at any station in the system. Also, given a particular kind of illumination employed during the object motion/velocity detection mode, there are various illumination parameters that can be controlled, namely: illumination intensity (e.g. low-power, half-power, full power); illumination beam width (e.g. narrow beam width, wide beam width); and illumination beam thickness (e.g. small beam thickness, large beam thickness). Based on these illumination control parameters, several different illumination control methods can be implemented at each illumination and imaging station in the system. Such methods are disclosed on detail in U.S. Pat. No. 7,540,424 and US Publication No. 2008-0283611 A1, supra.

FIG. 3 describes an exemplary embodiment of a computing and memory architecture platform that can be used to implement system 10 described in FIGS. 1B through 2C. As shown, this hardware computing and memory platform can be realized on a single PC board 58, along with the electro-optics associated with the illumination and imaging stations and other subsystems, and therefore functioning as an optical bench as well. As shown, the hardware platform comprises: at least one, but preferably multiple high-speed multi-core microprocessors, to provide a multi-processor architecture having high bandwidth video-interfaces and video memory and processing support; an FPGA (e.g. Spartan 3) for managing the digital image streams supplied by the plurality of digital image capturing and buffering channels, each of which is driven by a coplanar illumination and imaging station (e.g. linear CCD or CMOS image sensing array, image formation optics, etc) in the system; a robust multi-tier memory architecture including DRAM, Flash Memory, SRAM and even a hard-drive persistence memory in some applications; arrays of VLDs and/or LEDs, associated beam shaping and collimating/focusing optics; and analog and digital circuitry for realizing the illumination subsystem; interface board with microprocessors and connectors; power supply and distribution circuitry; as well as circuitry for implementing the others subsystems employed in the system.

Figure 4A:
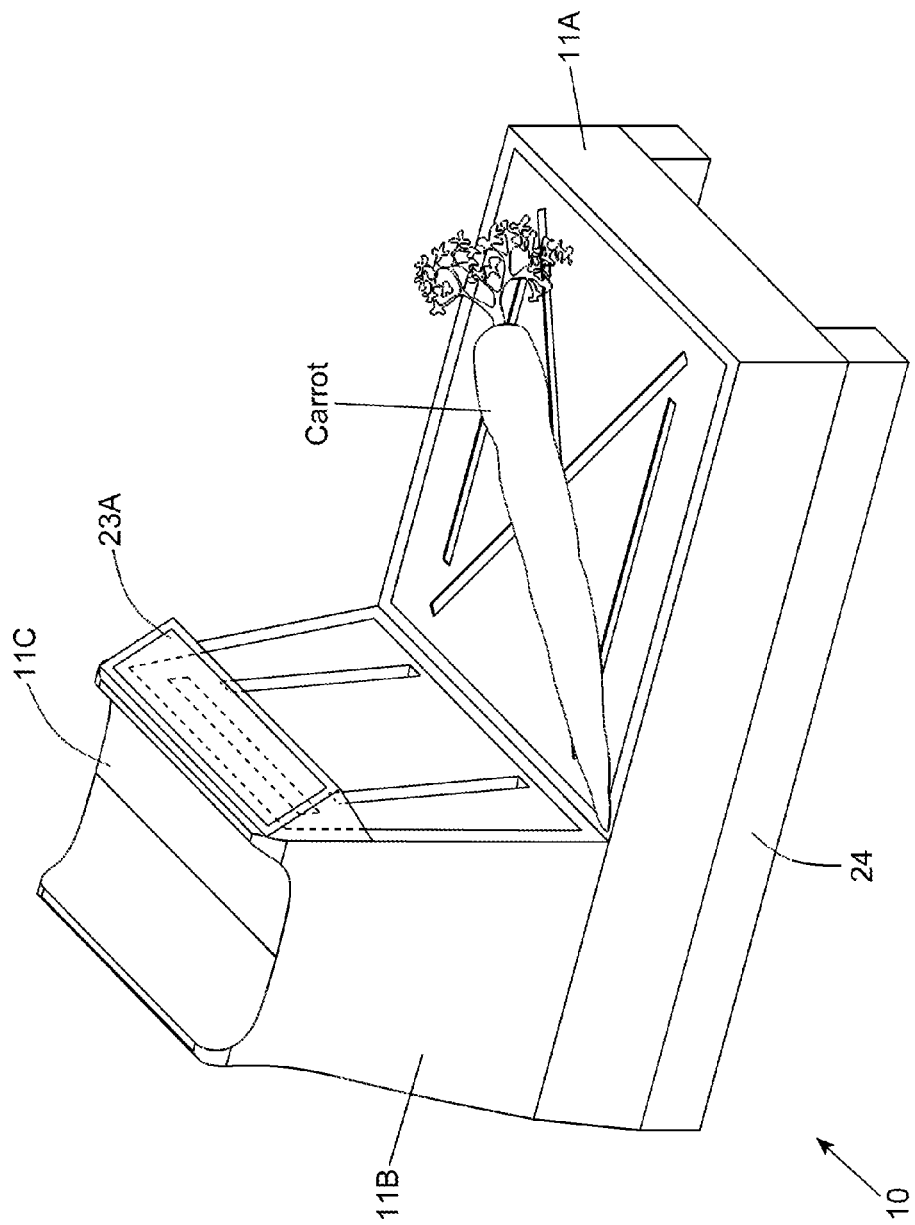
FIG. 4A is a perspective view of the POS-based imaging/weighing system of FIG. 1A, shown supporting produce items during a first weighing operation.
Figure 4B:
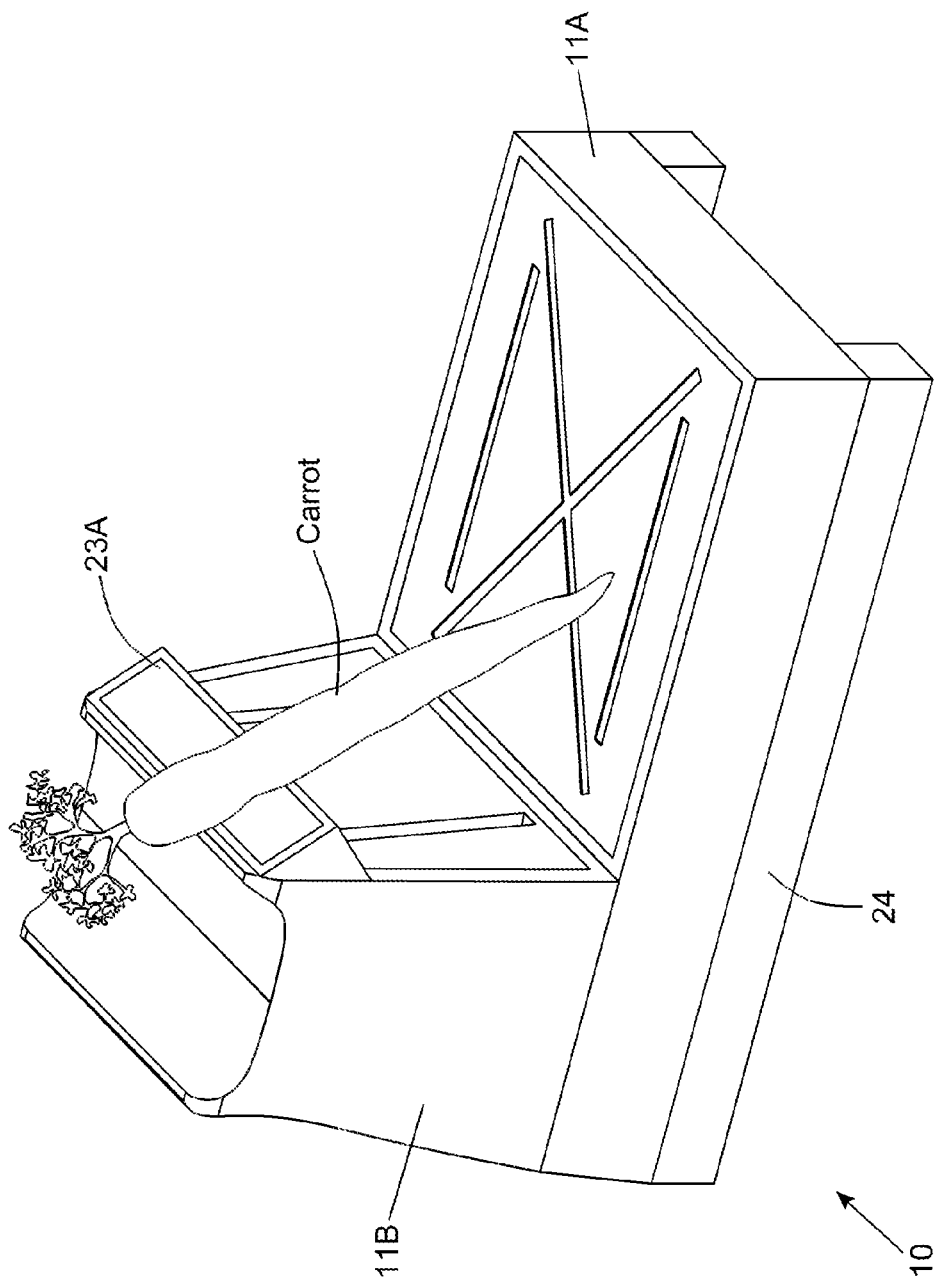
FIG. 4B is a perspective view of the POS-based imaging/weighing system of FIG. 1B, shown supporting produce items during a second weighing operation.
Figure 4C:
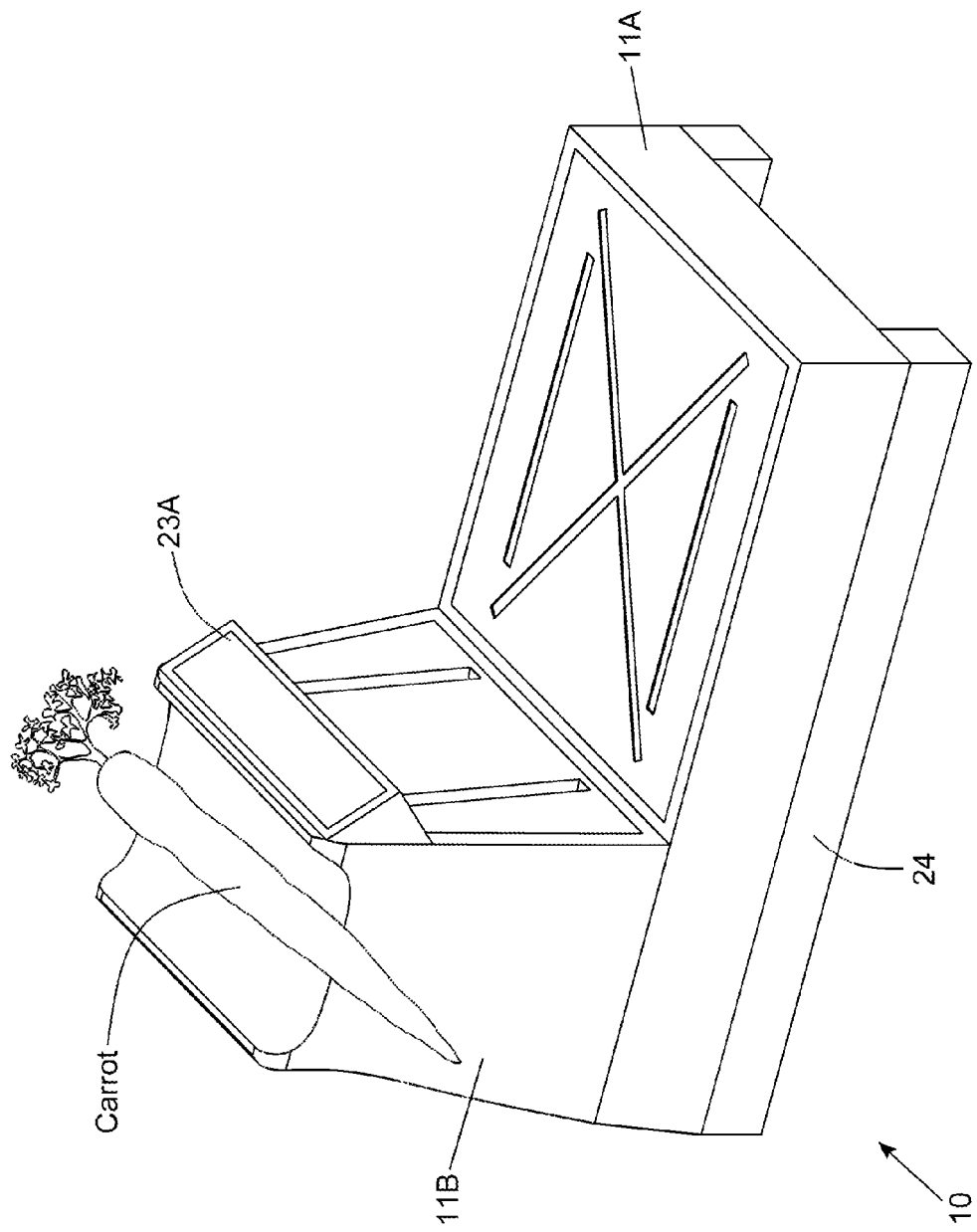
FIG. 4C is a perspective view of the POS-based imaging/weighing system of FIG. 1B, shown supporting produce items during a third weighing operation.

Referring to FIGS. 4A through 4C, a preferred method of produce weighing, supported by POS-based imaging/weighing will now be described in detail.

It is understood that before the system 10 is deployed into operation, the weigh scale subsystem 22 is calibrated so that the weight of the system housing and internal components is zeroed out and that the weigh scale weight measure reads 00.00 [lbs] or [grams], depending on the system of measure being employed. Such calibration techniques are well known in the weigh scale art.

As shown in FIG. 4A, a produce item of a particular type is placed on the imaging window 12A of the POS-based imaging/weighing system 10 during weighing operations. The cashier then selects the type of produce from the LCD-based touch-screen display screen 23A, and its price is automatically entered into the system, and then the electronic weigh scale subsystem 22 automatically measures the weight of the produce item on the imaging window 12A, and displays the total weight and price of the measured produce item on the cashier's LCD touch-screen display panel 23A and the customer's LCD display panel 23B.

As shown in FIG. 4B, a produce item of a particular type is placed on the horizontal imaging window 12A and up against the vertical imaging window 12B of the system 10 during weighing operations. The cashier then selects the type of produce from the LCD-based touch-screen display screen 23A, and its price is automatically entered into the system. Then the electronic weigh scale subsystem 22 automatically measures the weight of the produce item on the imaging window 12A, and displays the total weight and price of the measured produce item on the cashier's LCD touch-screen display panel 23A and the customer's LCD display panel 23B.

As shown in FIG. 4C, a produce item of a particular type is placed on the convex weigh surface 11C during weighing operations. The cashier then selects the type of produce from the LCD-based touch-screen display screen 23A, and its price is automatically entered into the system, and then the electronic weigh scale subsystem 22 automatically measures the weight of the produce item on the convex weigh surface 11C, and displays the total weight and price of the measured produce item on the cashier's LCD touch-screen display panel 23A and the customer's LCD display panel 23B.

Figure 5A:
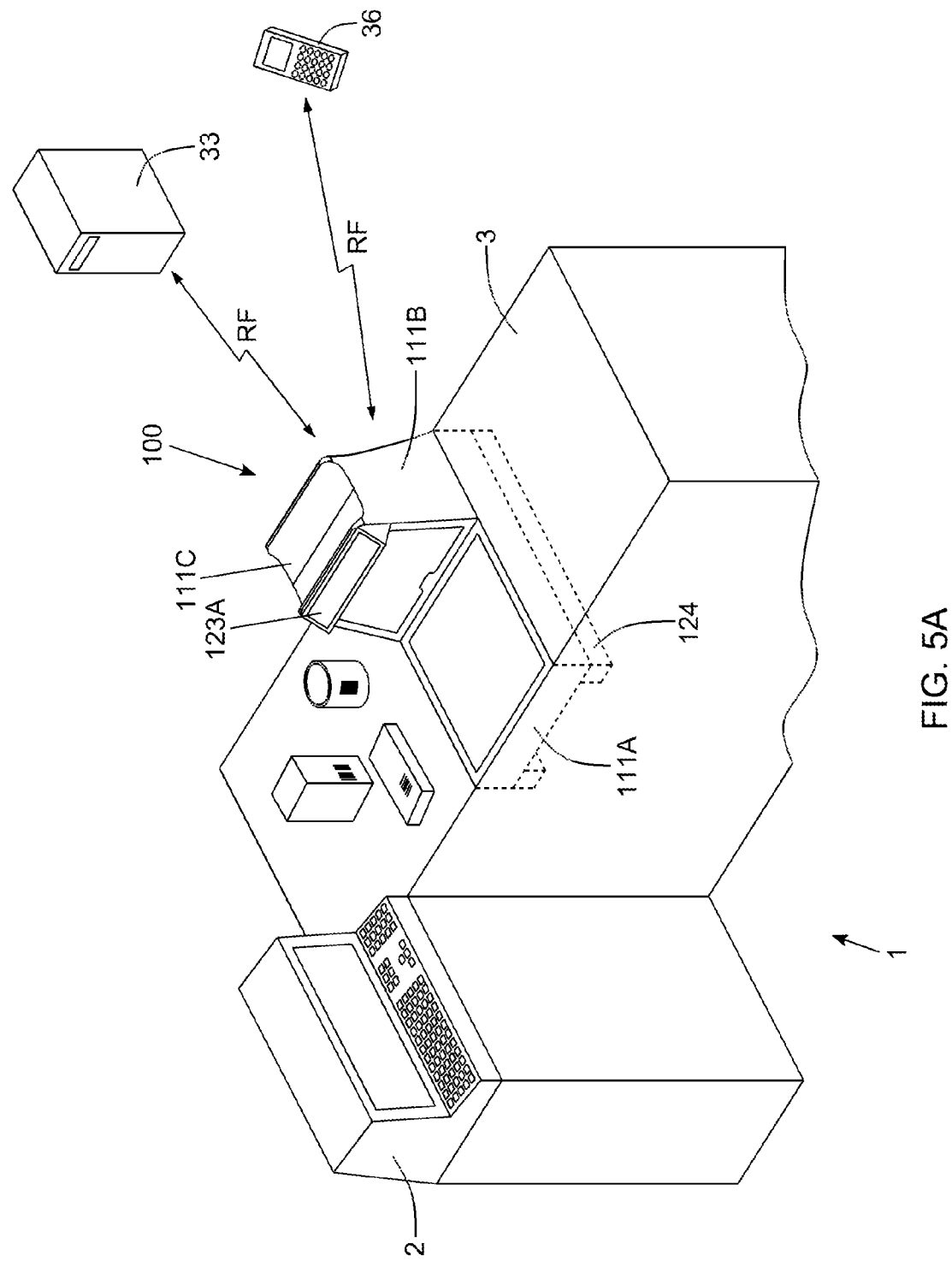
FIG. 5A is a perspective view of a retail POS station employing a POS-based laser and or imaging scanning system having an integrated electronic weight scale (i.e. POS-based scanning/weighing system) installed in or on the countertop surface of the POS station.

Specification of the Illustrative Embodiment of the POS-Based Scanning/Weighing System As shown in FIGS. 5A, the POS-based scanning/weighing system 100 includes a system housing 111 having a horizontal or bottom housing portion 111A with a horizontal optically transparent (glass) scanning window 112A, and a vertical or upper housing portion 111B with a vertical optically transparent (glass) scanning window 112B, arranged in a substantially orthogonal with respect to the horizontal imaging window 112A. As shown, each scanning window permits the projection of a plurality of laser scanning planes from a pair of laser scanning stations 150A and 150B installed beneath the system housing, to generate a complex omni-directional laser scanning pattern within the 3D scanning volume, as shown and described in greater detail in U.S. Pat. No. 7,422,156, incorporated herein by reference.

Figure 5B:
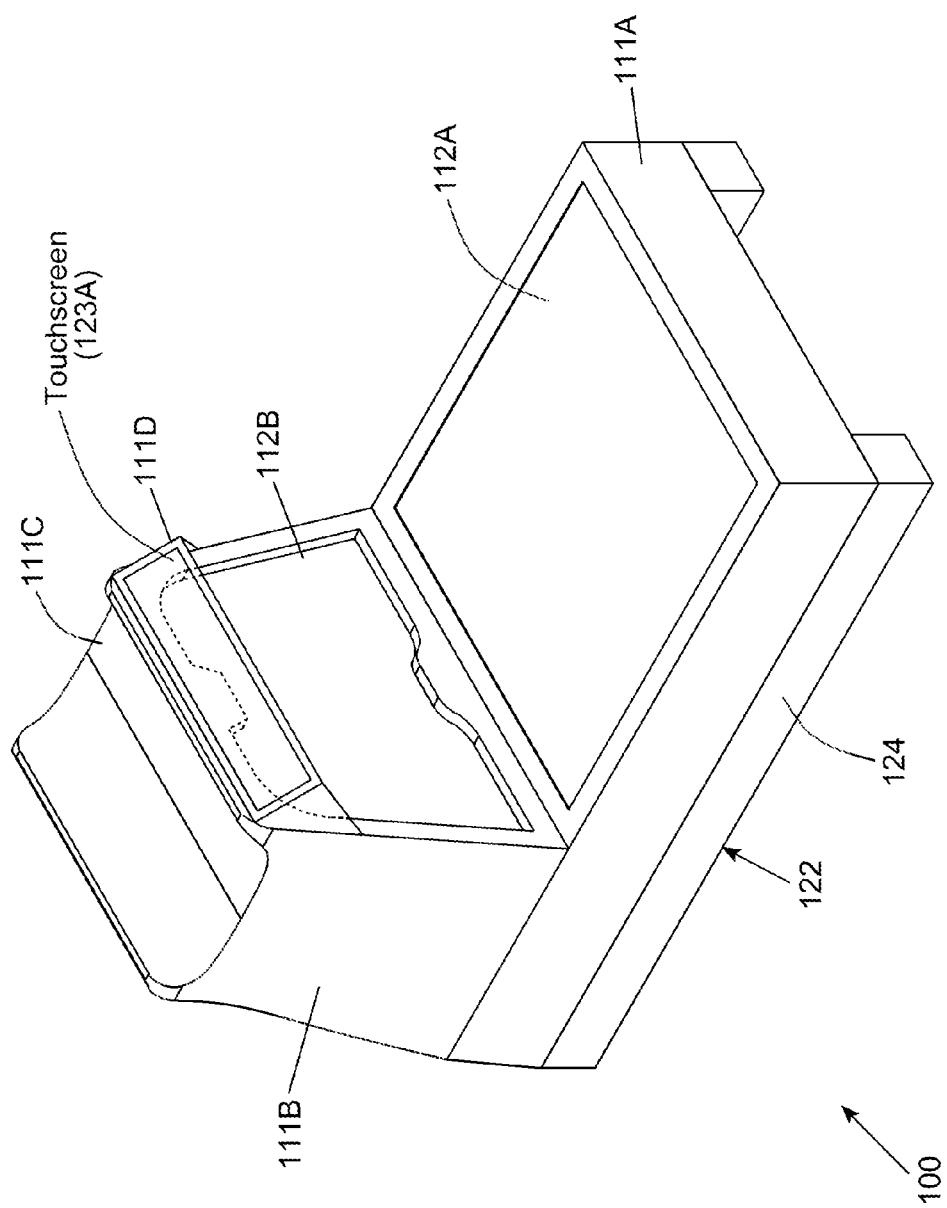
FIG. 5B is a perspective view of the POS-based scanning/weighing system of FIG. 5A, showing (i) produce weigh tray integrated into the top surface portion of the vertical housing section of the system, (ii) a LCD-based touch-screen produce price and weight display panel allowing the cashier to select produce items and prices and display produce price and weight information on the customers LCD-based produce weight/price display panel, with the touch of a finger; and (iii) vertical and horizontal scanning windows, through which a complex of laser and/or imaging scanning planes are projected into a 3D scanning volume defined between these two scanning windows.

As shown in FIG. 5B, the system housing has a top surface portion 111C which has a convex geometry to support a diverse group of produce objects during weighing operations. This feature of the system housing and its advantages during produce weighing operations will be described and illustrated in greater detail hereinafter with reference to FIGS. 7A, 7B and 7C.

Figure 5C:
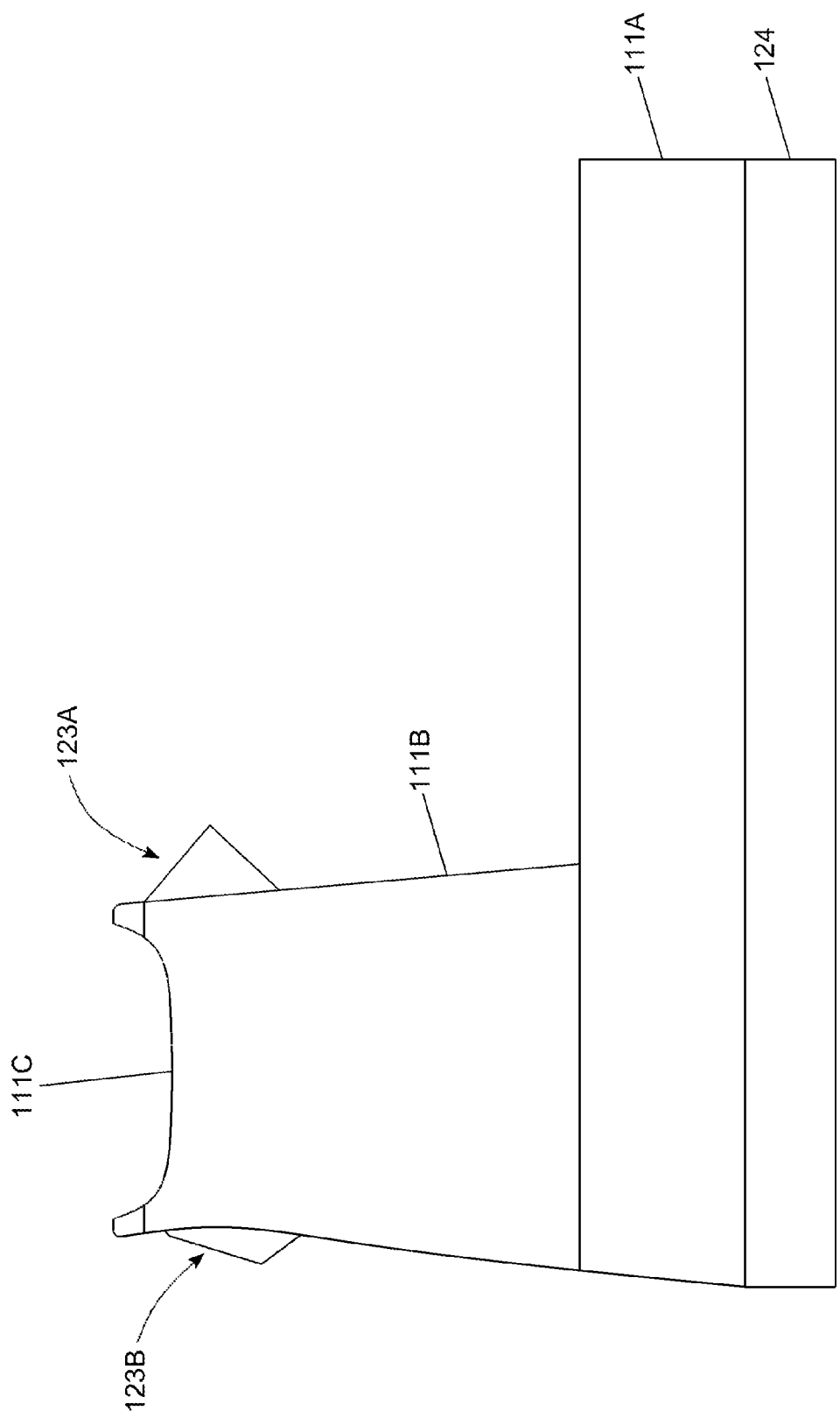
FIG. 5C is a side view of the POS-based scanning/weighing system of FIG. 5A.
Figure 5D:
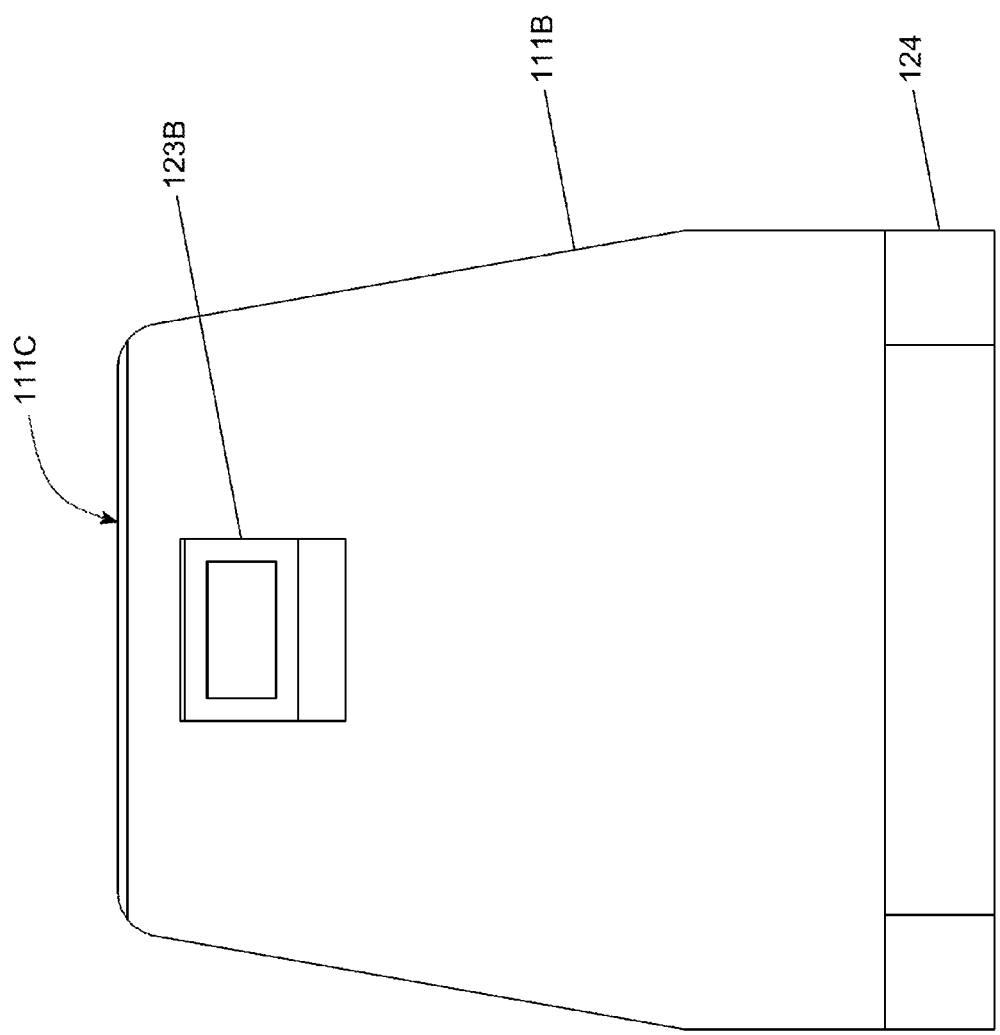
FIG. 5D is a customer-facing view of the POS-based scanning/weighing system of FIG. 5A, showing the customer's LCD-based produce weight/price display panel.
Figure 5E:
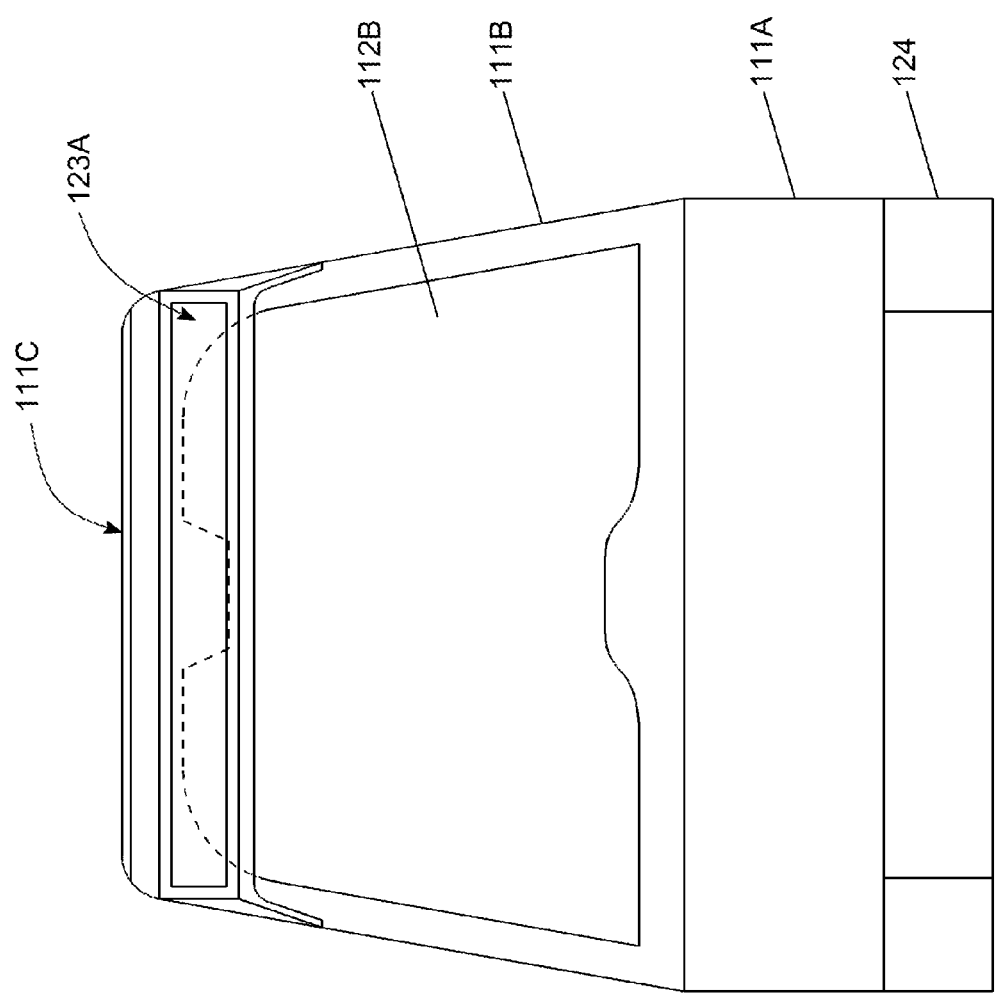
FIG. 5E is a cashier-facing view of the POS-based scanning/weighing system of FIG. 5A, showing the cashier's LCD-based produce weight/price display panel.
Figure 5F:
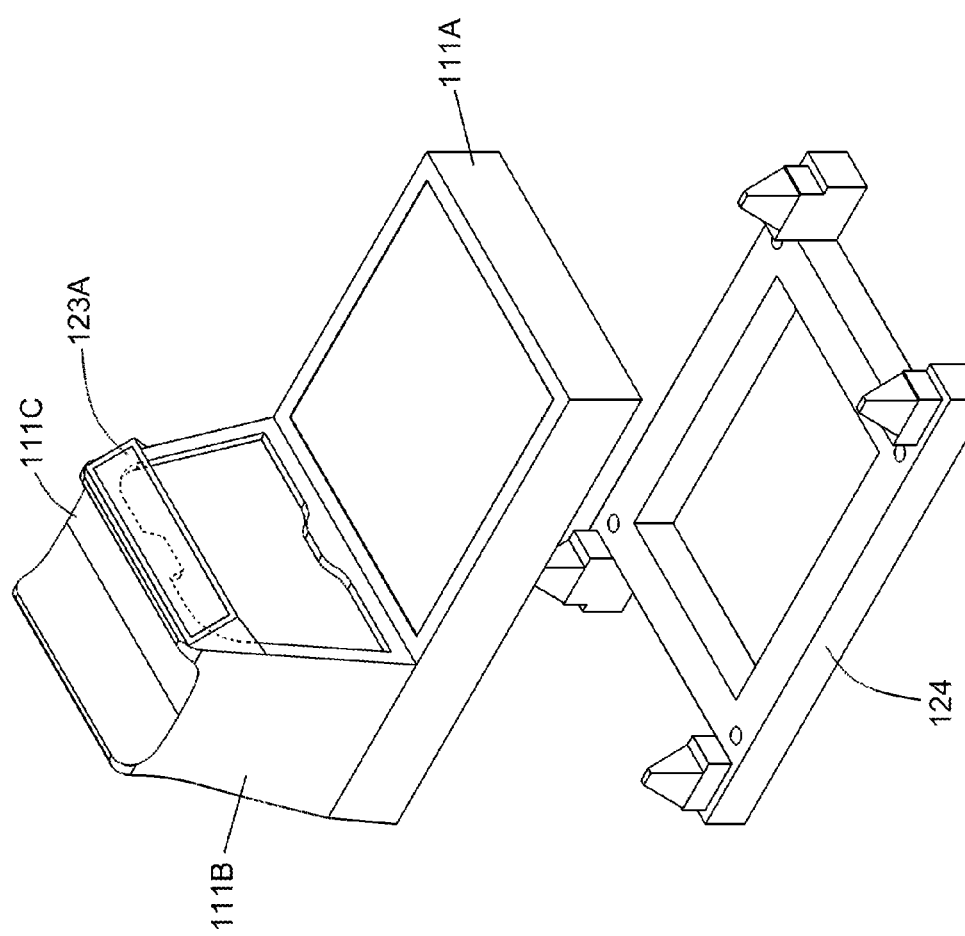
FIG. 5F is an exploded top perspective view of the POS-based scanning/weighing system of FIG. 5A, showing its system housing and subassembly lifted off the four weight-bearing corner posts provided on the base platform of the electronic scale subsystem.
Figure 5H:
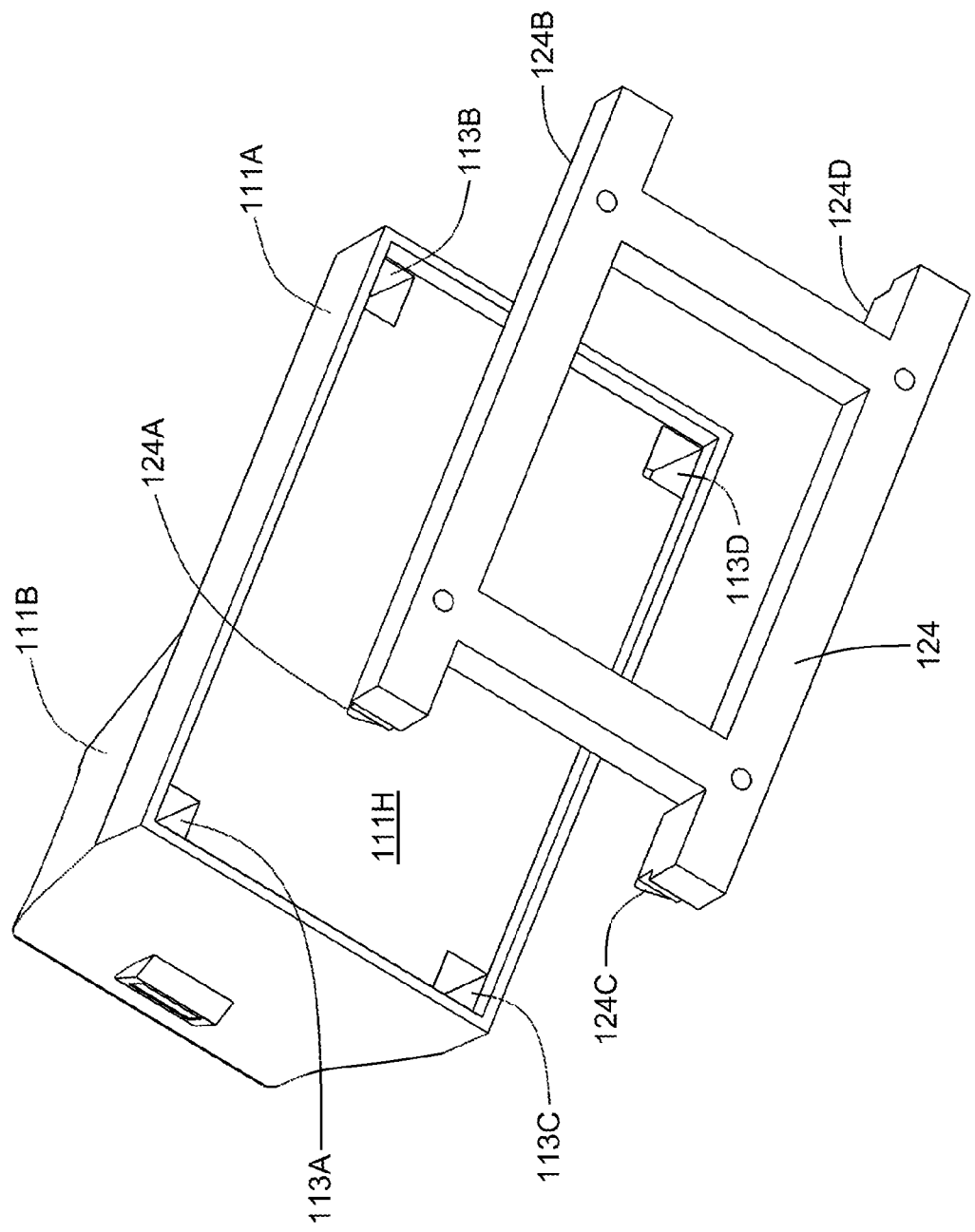
FIG. 5H is an exploded underneath perspective view of the POS-based scanning/weighing system of FIG. 5A, showing its system housing and subassembly lifted off the four weight-bearing corner posts provided on the base platform of the electronic scale subsystem.

As shown in FIG. 5H, the system housing 111 also includes a support frame 111H supporting the system housing 111, and having a plurality of spaced apart support surface 113A through 113D. In the illustrative embodiment, support frame 11H can also serve as an optical bench supporting the electro-optical and other components associated with the coplanar illumination and imaging subsystems 150.

Also, the system housing has a planar flange structure 111D which extends out from a first extreme edge 114A of the system housing, at about a 45 degree incline with respect to the countertop surface, in which the system is mounted, and supports an LCD-based touch screen produce price/weight display panel 123A, used by the cashier during checkout operations.

As shown in FIG. 5C, extending from a location close to a second extreme edge 114B of the system housing, parallel to the first extreme edge 114B, is a smaller planar flange structure 111E, also inclined at about a 45 degree with respect to the countertop surface in which the system is mounted. This planar flange structure 111E supports an detachable and angle adjustable LCD-based produce weight display panel 123B for displaying produce weight, weight unit of measurement, product information, price information to the customer being weighed by the cashier during checkout operations by the cashier during checkout operations at the POS station. When the system is not involved in weighing produce items, display panels 123A and 123B display the scale zero indication, and optionally, display product information and price information when reading code symbols on consumer product items, for which no weight measurement is required.

In an alternative embodiment, the display panel 123B can be supported in a display housing 11F supported on a pole stand mounted on the countertop adjacent the POS-based system, to display price and weight information, as shown in FIG. 1C1.

In general, the LCD touch-screen display panel 123A will display "function buttons" on its touch-screen surface, allowing the cashier to reset and to zero calibrate the integrated electronic weigh scale subsystem, and allowing maintenance engineers to access the scale configuration menu. The same display panel can additionally display buttons for other configurable functionalities such as adjusting beeper tone, adjusting volume, and the like.

Once the integrated code symbol reading subsystem, or an auxiliary connected hand-held scanner, reads a code symbol related to a specific produce item, the product identification number encoded in the code symbol on the product/produce-item is transmitted to the host system via a retail LAN/WAN. The host system returns the price, or price per unit weight and product information. In the event the produce item requires a produce weight measurement, the system controller automatically triggers the integrated electronic weigh scale subsystem, and generates an audible distinctive sound, notifying the cashier. The touch-screen display panel 123A displays product information and its price per unit weigh.

When a non-produce product is scanned, then the integrated code symbol reading subsystem produces price/product information which is automatically displayed on the cashier's LCD touch-screen display panel 123A, and on the LCD produce price/weight display panel 123B, mounted on the customer's side of the POS-based system. When a produce-item product is scanned, requiring weighing, then the system produces price/product information which is automatically displayed on both the cashier's LCD touch-screen display panel 123A, and the LCD produce price/weight display panel 123B, mounted on the customer's side of the POS-based system. This dual cashier/customer display functionality ensures that both the customer and cashier are aware of the price information being used in the produce weight measurement. It also provides an opportunity for the cashier and customer to validate that the scale is properly zero calibrated. Product information can be provided as text only, but may also include a prerecorded produce image available on the host system.

In applications where the POS host system on the store's LAN/WAN has no price per unit weight information for the produce item, or the produce item has no code symbol, the POS-based system optionally allows the cashier's LCD touch-screen display panel 123A to display a menu structure to retrieve the price per unit for an produce item or group of produce items. Preferably, the menu structure comprises (i) graphical icons or representations of a predefined produce item or produce groups, allowing a narrowing the search field criteria, (ii) a soft input panel where, by entering the alphabetic characters of the produce name, it displays more relevant predefined records by every character that has been entered. FIGS. 4D1 through 4D6 illustrates a set of GUI screens that might be displayed on the LCD touch-screen display panel 1 during an illustrative embodiment, to realize such a menu structure on the POS-based system of the present disclosure LCD touch-screen display panel 123A and/or LCD panel 123B can be realized in many different ways well known in the art.

Other useful techniques which can be practiced on the POS-based scanning/weighing system 100 are disclosed is U.S. Pat. Nos. 7,841,524 and 7,753,269, incorporated herein by reference.

As shown in FIG. 6, the POS-based scanning/weighing system 100 comprises: a pair of laser scanning stations (i.e. subsystems) 150A and 150B, for generating and projecting a complex of laser scanning planes into the 3D scanning volume of the system; a scan data processing subsystem 120 for supporting automatic processing of scan data collected from each laser scanning plane in the system; an electronic weight scale 122 employing four load cells 123A through 123D positioned at each corner of a scale base 124, for supporting the lower portion of the system housing in matched recesses 113A through 113D, for the purpose of rapidly measuring the weight of objects positioned on the window aperture of the system, on the convex weigh surface 111C, or against any surface of the system housing, and automatically generating electronic data representative of measured weight of the objects; an input/output subsystem 128 for interfacing with the image processing subsystem, the electronic weight scale 122, RFID reader 126, credit-card reader 127 and Electronic Article Surveillance (EAS) Subsystem 128 (including EAS tag deactivation block integrated in system housing); a wide-area wireless interface (WIFI) 131 including RF transceiver and antenna 131A for connecting to the TCP/IP layer of the Internet as well as one or more image storing and processing RDBMS servers 133 (which can receive images lifted by system for remote processing by the image storing and processing servers 133); a BlueTooth® RF 2-way communication interface 135 including RF transceivers and antennas 103A for connecting to Blue-tooth® enabled hand-held scanners, imagers, PDAs, portable computers 136 and the like, for control, management, application and diagnostic purposes; and a control subsystem 137 for controlling (i.e. orchestrating and managing) the operation of the coplanar illumination and imaging stations (i.e. subsystems), integrated electronic weight scale 122, and other subsystems.

In FIG. 6, the bar code symbol reading module employed along each channel of the scan data processing subsystem 120 can be realized using conventional bar code reading software well known in the art. Also, the system provides full support for (i) dynamically and adaptively controlling system control parameters in the digital image capture and processing system, as disclosed and taught in Applicants' U.S. Pat. No. 7,607,581, as well as (ii) permitting modification and/or extension of system features and function, as disclosed and taught in U.S. Pat. No. 7,708,205, supra.

The IR-based object motion/velocity sensing fields can be generated in various ways from either the horizontal and/or vertical scanning windows, using techniques including from a plurality of IR Pulse-Doppler LIDAR motion/velocity detection subsystems 140 installed within the system housing. Such subsystem can be realized using a plurality of IR (Coherent or Incoherent) Pulse-Doppler LIDAR motion/velocity sensing chips mounted in the laser scanning station 150A and/or 150B. In the illustrative embodiments of FIG. 6, three such IR Pulse-Doppler LIDAR motion/velocity sensing chips (e.g. Philips PLN2020 Twin-Eye 850 nm IR Laser-Based Motion/Velocity Sensor System in a Package (SIP)) are employed in each laser scanning station in the system. Details regarding this subsystem are described in US Publication No. 2008/0283611 A1, and corresponding portions of the present Patent Specification thereof Referring to FIG. 7A through 7C, a preferred method of weighing produce using the POS-based scanning/weighing system 100 will now be described in detail.

It is understood that before the system is deployed into operation, the weigh scale subsystem 122 is calibrated so that the weight of the system housing and internal components is zeroed out and that the weigh scale weight measure reads 00.00 [lbs] or [grams] depending on the system of measure being employed. Such calibration techniques are well known in the weigh scale art.

Figure 7A:
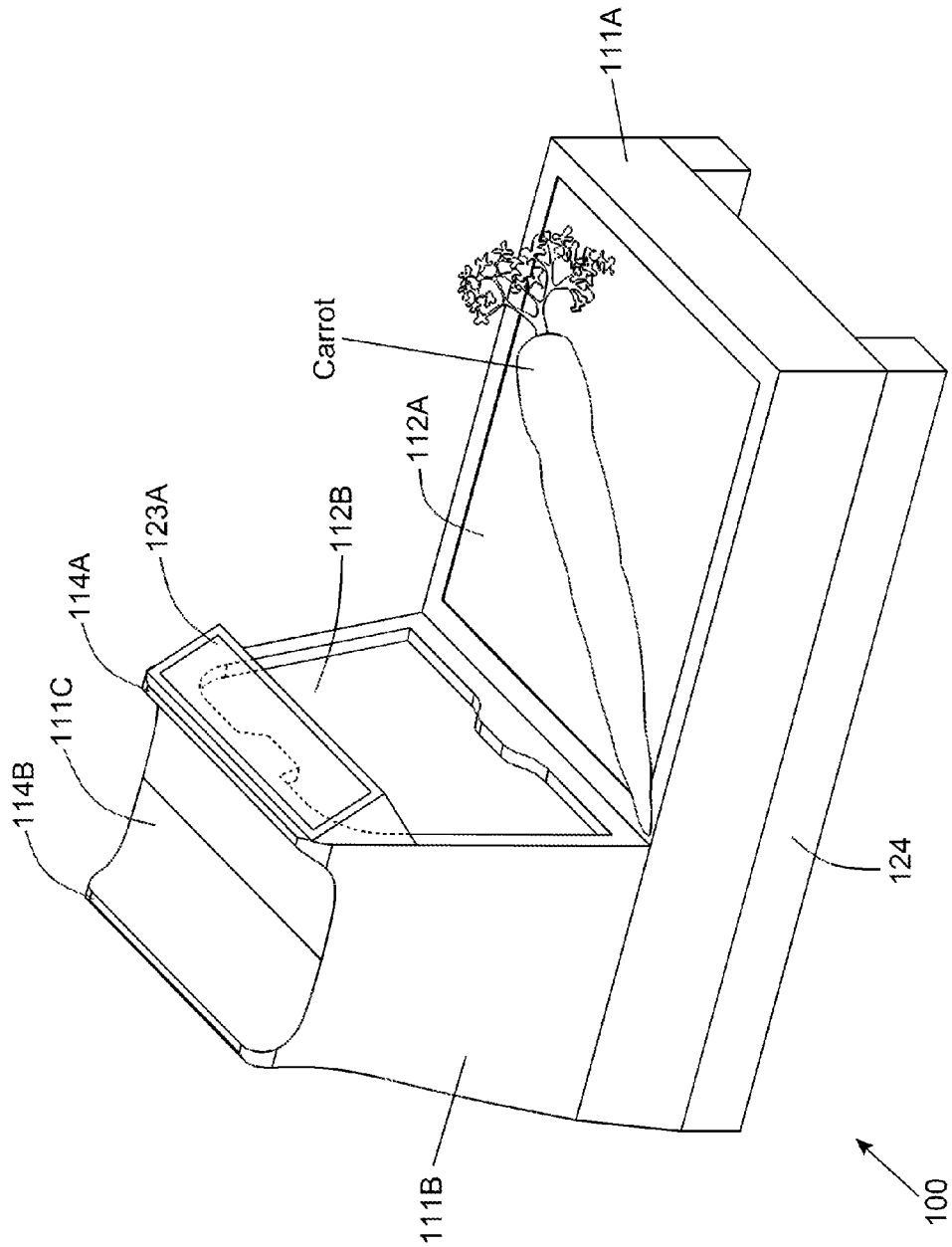
FIG. 7A is a perspective view of the POS-based scanning/weighing system of FIG. 5A, shown supporting produce items during a first weighing operation.

As shown in FIG. 7A, a produce item of a particular type is placed on the scanning window 112A of the POS-based scanning/weighing system 100 during weighing operations. The cashier then selects the type of produce from the LCD-based touch-screen display screen 123A, and its price is automatically entered into the system, and then the electronic weigh scale subsystem 122 automatically measures the weight of the produce item on the scanning window 112A, and displays the total weight and price of the measured produce item on the cashier's LCD touch-screen display panel 123A and the customer's LCD display panel 123B.

Figure 7B:
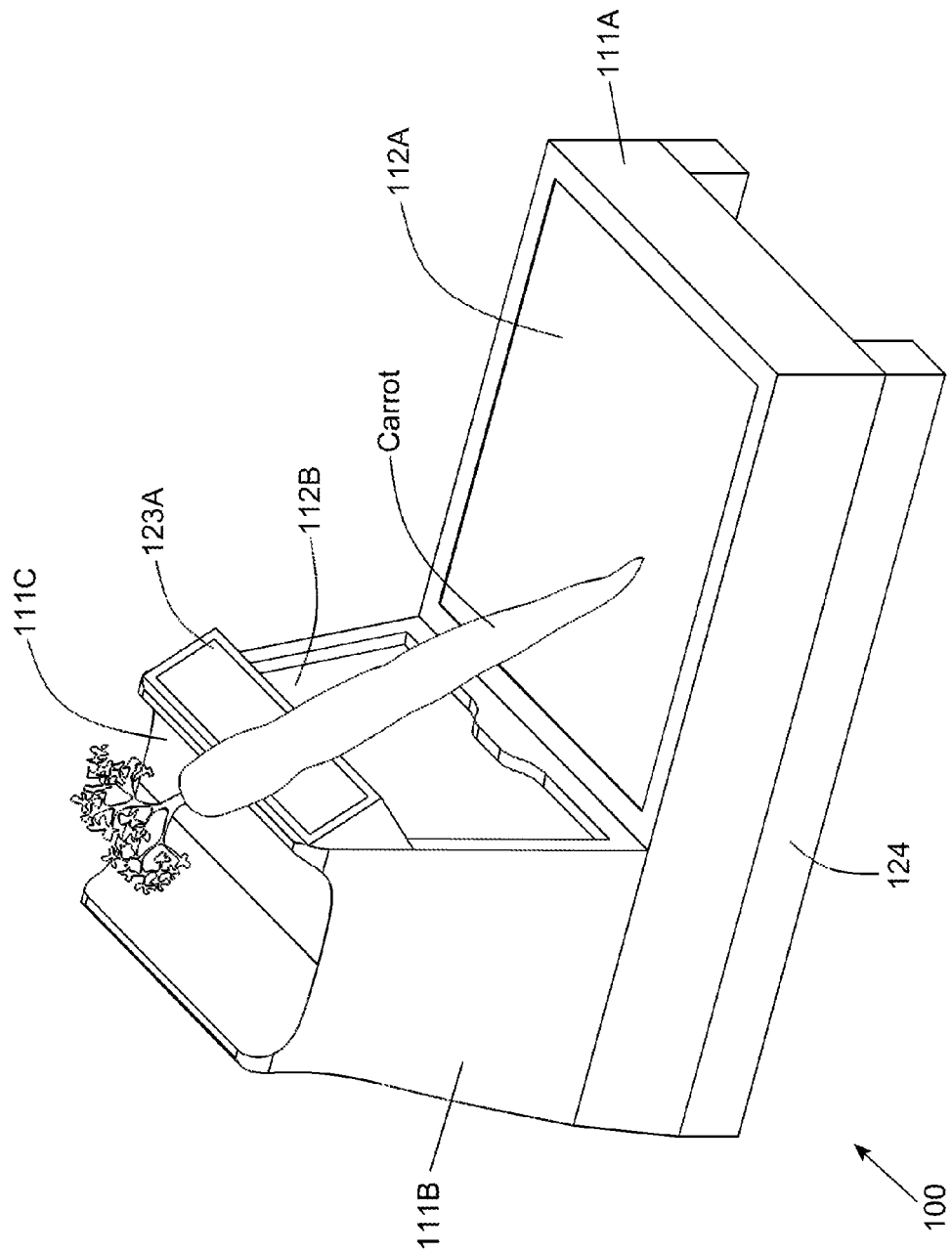
FIG. 7B is a perspective view of the POS-based scanning/weighing system of FIG. 7B, shown supporting produce items during a second weighing operation.

As shown in FIG. 7B, a produce item of a particular type is placed on the horizontal scanning window 112A and up against the vertical scanning window 112B of the POS-based scanning/weighing system 100 during weighing operations. The cashier then selects the type of produce from the LCD-based touch-screen display screen 123A, and its price is automatically entered into the system. Then the electronic weigh scale subsystem 122 automatically measures the weight of the produce item on the scanning window 112A, and displays the total weight and price of the measured produce item on the cashier's LCD touch-screen display panel 123A and the customer's LCD display panel 123B.

Figure 7C:
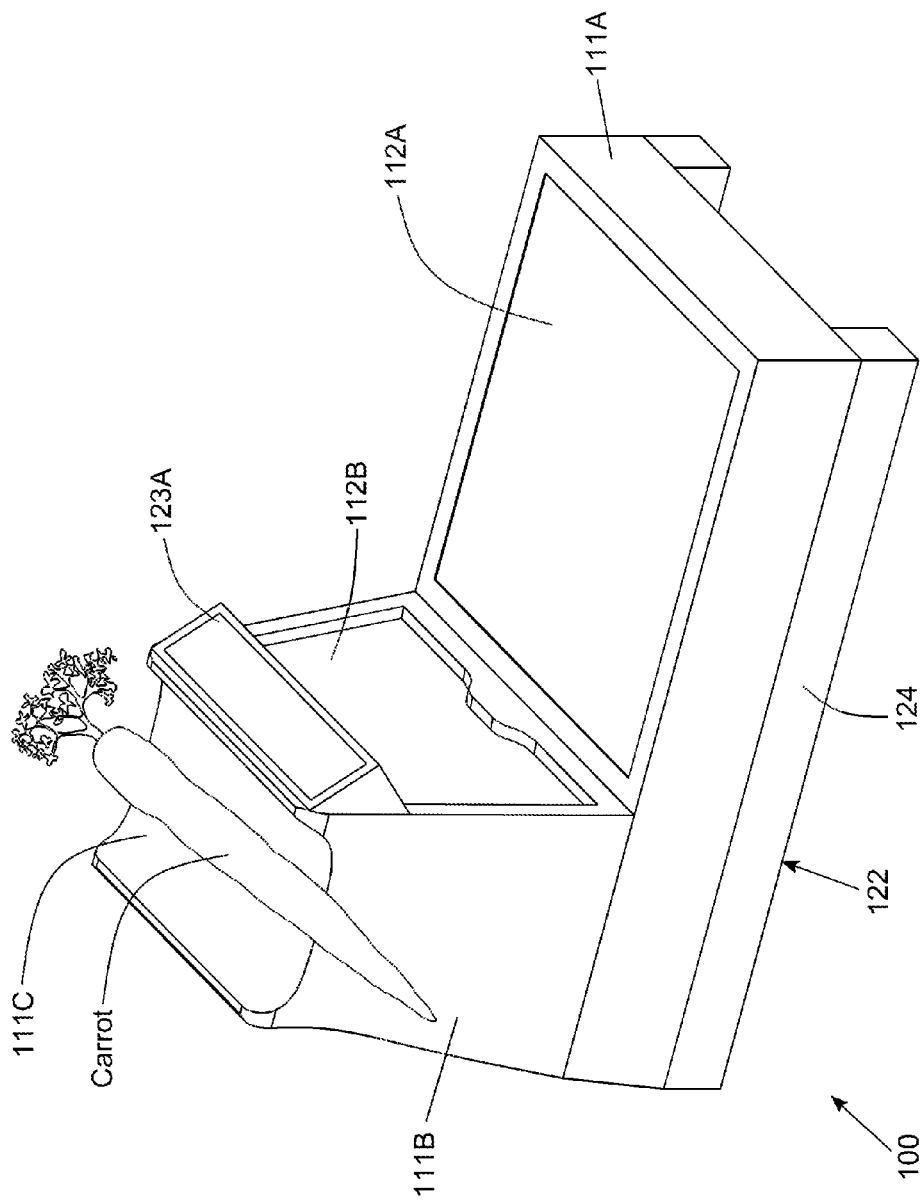
FIG. 7C is a perspective view of the POS-based scanning/weighing system of FIG. 5A, shown supporting produce items during a third weighing operation.

As shown in FIG. 7C, a produce item of a particular type is placed on the convex weigh surface 111C during weighing operations. The cashier then selects the type of produce from the LCD-based touch-screen display screen 123A, and its price is automatically entered into the system, and then the electronic weigh scale subsystem 122 automatically measures the weight of the produce item on the convex weigh surface 111C, and displays the total weight and price of the measured produce item on the cashier's LCD touch-screen display panel 123A and the customer's LCD display panel 123B.

While digital imaging and laser scanning embodiments of the POS-based system have been disclosed, it is understood that alternative methods employing a combination of such techniques can be used to implement such functions within the system.

Several modifications to the illustrative embodiments have been described above. It is understood, however, that various other modifications to the illustrative embodiment will readily occur to persons with ordinary skill in the art. All such modifications and variations are deemed to be within the scope of the accompanying Claims.

The invention claimed is:

1. A symbol-reading system, comprising:
a system housing comprising:
a horizontal housing portion comprising a window;
a vertical housing portion comprising a window, the vertical housing portion being configured substantially orthogonal to the horizontal housing portion; and
a support frame supportively positioned below both the horizontal housing portion and the vertical housing portion;
a symbol reading subsystem, disposed in the system housing, for reading symbols on objects within a reading volume defined relative to the vertical housing portion's window and the horizontal housing portion's window and producing data representative of the read symbols; and
a weigh scale subsystem comprising at least one load cell positioned below the support frame, and supporting the entirety of the system housing, the weigh scale subsystem being configured for measuring the weight of objects positioned on one or both of the horizontal housing portion and the vertical housing portion and producing data representative of measured weights;
wherein the symbol reading subsystem is configured for projecting illumination and imaging planes to read symbols on objects within the reading volume.

2. The symbol-reading system of claim 1, wherein the illumination and imaging planes comprise coplanar illumination and imaging planes.

3. The symbol-reading system of claim 1, wherein the symbol reading subsystem is configured for projecting illumination and imaging planes through the vertical housing portion's window and the horizontal housing portion's window.

4. The symbol-reading system of claim 1, wherein the weigh scale subsystem comprises four load cells beneath four corners of the system housing.

5. The symbol-reading system of claim 1, wherein the symbol reading subsystem is configured for projecting laser scanning planes to read symbols on objects within a scanning volume defined relative to the vertical housing portion's window and the horizontal housing portion's window.

6. The symbol-reading system of claim 5, wherein the laser scanning planes comprise an omni-directional laser scanning pattern within the scanning volume.

7. A symbol-reading system, comprising:
a system housing comprising:
a horizontal housing portion comprising a window;
a vertical housing portion comprising a window, the vertical housing portion being configured substantially orthogonal to the horizontal housing portion;
a symbol reading subsystem, disposed in the system housing, for reading symbols on objects within a reading volume defined relative to the vertical housing portion's window and the horizontal housing portion's window and producing data representative of the read symbols; and
a weigh scale subsystem comprising
a weigh surface including an entirety of both the horizontal housing portion and the vertical housing portion, and
at least one load cell that supports the entirety of the weigh surface, the weigh scale subsystem being configured for measuring the weight of objects positioned anywhere on the system housing and producing data representative of measured weights.

8. The symbol-reading system of claim 7, wherein the weigh scale subsystem comprises four load cells beneath four corners of the system housing.

9. The symbol-reading system of claim 7, wherein the symbol reading subsystem is configured for projecting illumination and imaging planes through the vertical housing portion's window.

10. The symbol-reading system of claim 9, wherein the illumination and imaging planes comprise coplanar illumination and imaging planes.

11. The symbol-reading system of claim 7, wherein the symbol reading subsystem is configured for projecting laser scanning planes to read symbols on objects within a scanning volume defined relative to the vertical housing portion's window and the horizontal housing portion's window.

12. A symbol-reading system, comprising:
a system housing comprising
- a horizontal housing portion, and
- a vertical housing portion, positioned substantially orthogonal to the horizontal housing portion; and
- a support frame for supporting the horizontal housing portion and the vertical housing portion;

a weigh surface integrated with both the horizontal housing portion and the vertical housing portion;

a symbol reading subsystem, disposed in the system housing, for reading symbols on objects and producing data representative of the read symbols; and a weigh scale subsystem comprising at least one load cell positioned below the horizontal housing portion and the support frame and supporting the entirety of the system housing positioned thereon, the weigh scale subsystem being configured for measuring the weight of objects positioned anywhere on the system housing and producing data representative of measured weights.

13. The symbol-reading system of claim 12, wherein the weigh scale subsystem comprises four load cells beneath four corners of the system housing.

14. The symbol-reading system of claim 12, wherein:
the vertical housing portion comprises a window; and
the symbol reading subsystem is configured for projecting illumination and imaging planes to read symbols on objects within an imaging volume defined relative to the vertical housing portion's window.

15. The symbol-reading system of claim 14, wherein the illumination and imaging planes comprise coplanar illumination and imaging planes.

16. The symbol-reading system of claim 14, wherein:
the horizontal housing portion comprises a window; and
the symbol reading subsystem is configured for projecting illumination and imaging planes through the horizontal housing portion's window to read symbols on objects within the imaging volume.

17. The symbol-reading system of claim 12, wherein:
the vertical housing portion comprises a window; and
the symbol reading subsystem is configured for projecting laser scanning planes to read symbols on objects within a scanning volume defined relative to the vertical housing portion's window.

18. The symbol-reading system of claim 17, wherein the laser scanning planes comprise an omni-directional laser scanning pattern within the scanning volume.

19. The symbol-reading system of claim 12, wherein:
the vertical housing portion comprises a window;
the horizontal housing portion comprises a window; and
the symbol reading subsystem is configured for projecting laser scanning planes to read symbols on objects within a scanning volume defined relative to the vertical housing portion's window and the horizontal housing portion's window.

20. The symbol-reading system of claim 12, wherein the weigh scale subsystem comprises a touch-screen display panel for facilitating a user's selection of items to be weighed and displaying price and weight information.

21. The symbol-reading system of claim 12, wherein the weigh scale subsystem comprises a display panel mounted on a customer-facing side of the system.

* * * * *